(12) United States Patent
Takahashi et al.

(10) Patent No.: US 9,966,097 B2
(45) Date of Patent: May 8, 2018

(54) OPTICAL RECORDING MEDIUM HAVING CONDITION MANAGEMENT AREA FOR MANAGING THE RECORDING CONDITION OF MANAGEMENT INFORMATION

(71) Applicant: Panasonic Intellectual Property Management Co., Ltd., Osaka (JP)

(72) Inventors: Yoshihisa Takahashi, Osaka (JP); Akihito Yoshimi, Osaka (JP); Kenji Takauchi, Osaka (JP); Yasumori Hino, Nara (JP); Motoshi Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/475,693

(22) Filed: Mar. 31, 2017

(65) Prior Publication Data

US 2017/0206923 A1  Jul. 20, 2017

Related U.S. Application Data

(60) Division of application No. 15/298,627, filed on Oct. 20, 2016, which is a continuation of application No. PCT/JP2015/001937, filed on Apr. 7, 2015.

(30) Foreign Application Priority Data

May 20, 2014  (JP) ................................. 2014-104137

(51) Int. Cl.
*G11B 7/24* (2013.01)
*G11B 7/0037* (2006.01)
(Continued)

(52) U.S. Cl.
CPC ...... *G11B 7/00375* (2013.01); *G11B 7/00718* (2013.01); *G11B 20/1217* (2013.01);
(Continued)

(58) Field of Classification Search
None
See application file for complete search history.

(56) References Cited

U.S. PATENT DOCUMENTS 5,508,995 A    4/1996  Moriya et al.
5,872,767 A *  2/1999  Nagai .................... G11B 7/005
                                                        369/275.3
(Continued)

FOREIGN PATENT DOCUMENTS

EP    1 564 740    1/2013
JP    7-29185      1/1995
(Continued)

OTHER PUBLICATIONS

International Search Report dated Jun. 30, 2015 in International (PCT) Application No. PCT/JP2015/001937.
(Continued)

*Primary Examiner* — Tan X Dinh
(74) *Attorney, Agent, or Firm* — Wenderoth, Lind & Ponack, L.L.P.

(57) ABSTRACT

An information recording method of the present disclosure is an information recording method for recording information on a write-once information recording medium, including one or more recording layers, each of the recording layers being spiral-shaped on which a land track and a groove track are alternately repeated as recording tracks, each of the recording tracks being divided into blocks, each of the blocks being a minimum unit in which recording is performed. The information recording method includes: recording the information on the information recording medium in a unit of each of the blocks; and controlling recording on the information recording medium. In the control step, switching is performed whether to perform recording in a block to be recorded in which the information (Continued)

is to be recorded next among the blocks based on recording conditions of the recording tracks adjacent on both sides of the block to be recorded.

3 Claims, 17 Drawing Sheets

(51) Int. Cl.
    *G11B 7/007*     (2006.01)
    *G11B 20/12*     (2006.01)
    *G11B 7/004*     (2006.01)
    *G11B 20/10*     (2006.01)
    *G11B 20/18*     (2006.01)
    *G11B 7/0045*     (2006.01)
    *G11B 27/32*     (2006.01)

(52) U.S. Cl.
    CPC .............. *G11B 7/004* (2013.01); *G11B 7/007* (2013.01); *G11B 7/0045* (2013.01); *G11B 7/00745* (2013.01); *G11B 20/10* (2013.01); *G11B 20/1889* (2013.01); *G11B 27/329* (2013.01); *G11B 2020/1238* (2013.01)

(56) References Cited

U.S. PATENT DOCUMENTS

| | | | | |
|---|---|---|---|---|
| 6,172,961 B1 * | 1/2001 | Tanoue | .............. | G11B 7/00718 369/275.4 |
| 6,298,033 B1 * | 10/2001 | Tanoue | ................ | G11B 7/0079 369/275.3 |
| 6,570,837 B1 * | 5/2003 | Kikuchi | ................ | G11B 19/02 369/275.3 |
| 6,898,171 B1 * | 5/2005 | Sugaya | .............. | G11B 7/00745 369/275.3 |
| 2002/0110365 A1 * | 8/2002 | Maruyama | ............ | G11B 27/036 369/275.3 |
| 2004/0105365 A1 * | 6/2004 | Furumiya | ............ | G11B 7/0037 369/275.3 |
| 2004/0202083 A1 * | 10/2004 | Ogawa | ................... | G11B 7/007 369/275.3 |
| 2004/0228255 A1 * | 11/2004 | Noda | ................. | G11B 20/1217 369/275.3 |
| 2004/0257937 A1 | 12/2004 | Kato et al. | | |
| 2005/0122890 A1 | 6/2005 | Ando et al. | | |
| 2006/0114795 A1 | 6/2006 | Watanabe et al. | | |
| 2006/0233066 A1 | 10/2006 | Ando | | |
| 2008/0292829 A1 * | 11/2008 | Shishido | ............ | G11B 20/1217 369/275.3 |
| 2011/0194393 A1 * | 8/2011 | Akimoto | ............ | G11B 7/00736 369/275.3 |
| 2013/0201813 A1 * | 8/2013 | Akimoto | ............ | G11B 7/00736 369/275.3 |
| 2016/0343394 A1 * | 11/2016 | Takahashi | ............ | G11B 7/0079 |

FOREIGN PATENT DOCUMENTS

| | | |
|---|---|---|
| JP | 10-312544 | 11/1998 |
| JP | 11-296979 | 10/1999 |
| JP | 2003-272173 | 9/2003 |
| JP | 2004-171714 | 6/2004 |
| JP | 2004-272990 | 9/2004 |
| JP | 2006-164495 | 6/2006 |
| JP | 2006-268975 | 10/2006 |
| JP | 2007-521600 | 8/2007 |
| JP | 2008-165902 | 7/2008 |

OTHER PUBLICATIONS

"The Strategy of Panasonic for Blue-ray Disc", Nikkei Business Publications, Inc., 2006, p. 30, chart 2-2.

* cited by examiner

FIG. 10

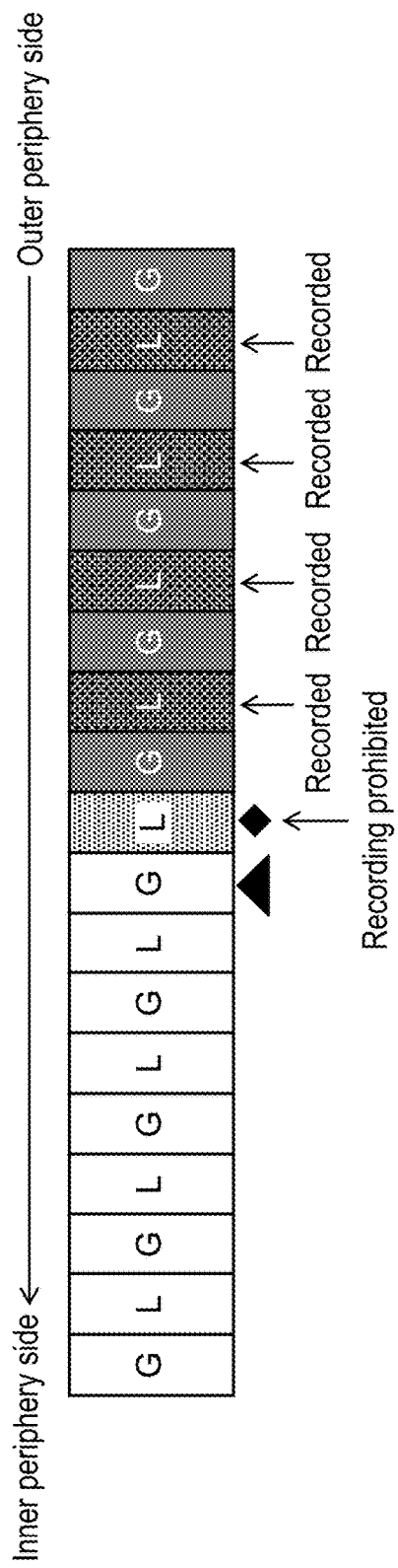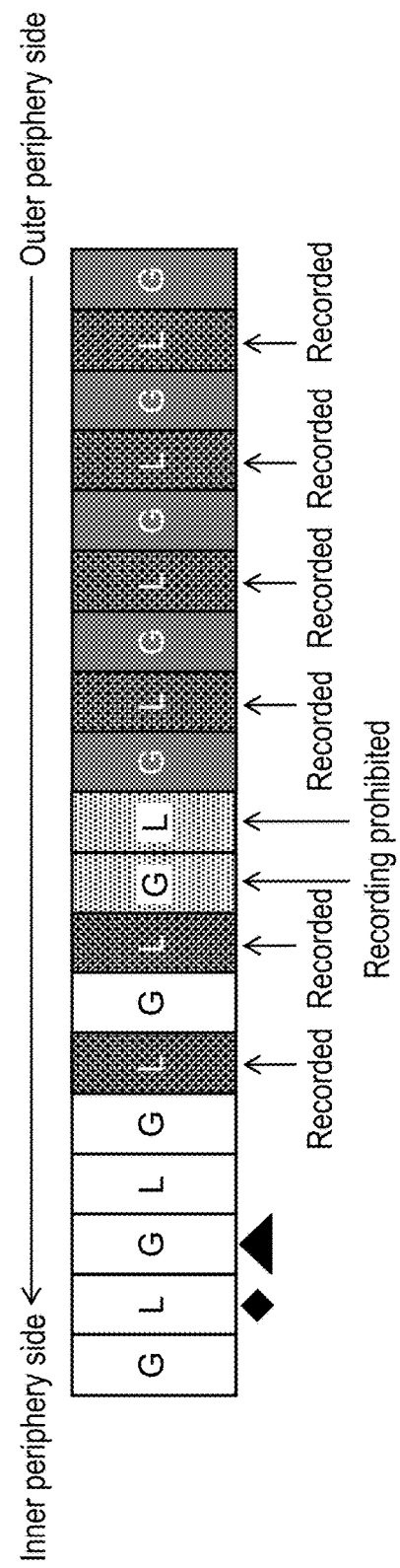

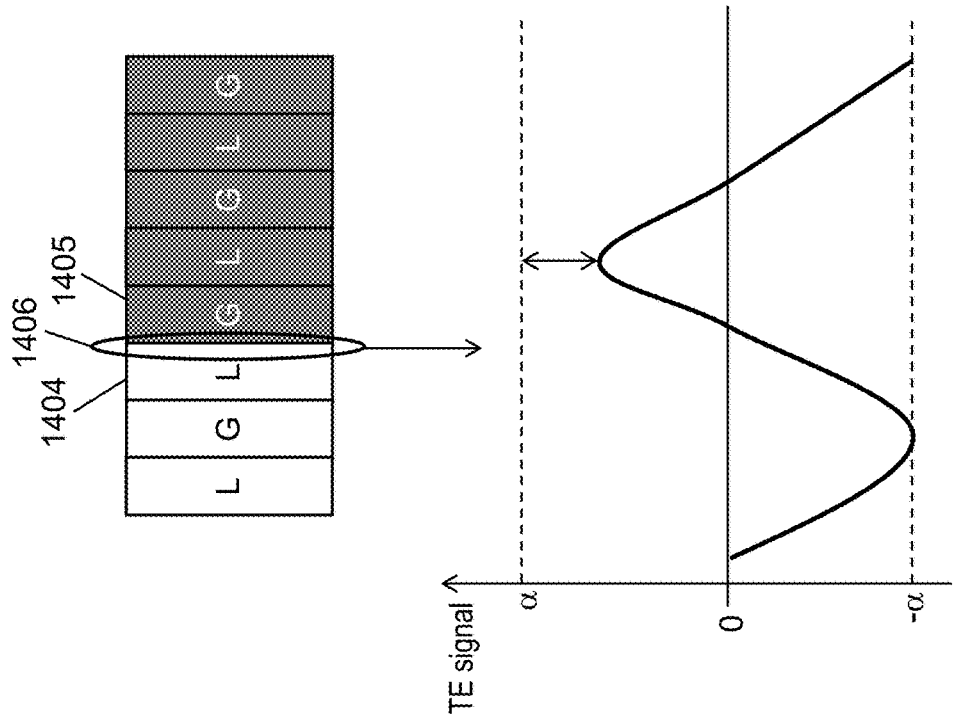
FIG. 19A - PRIOR ART
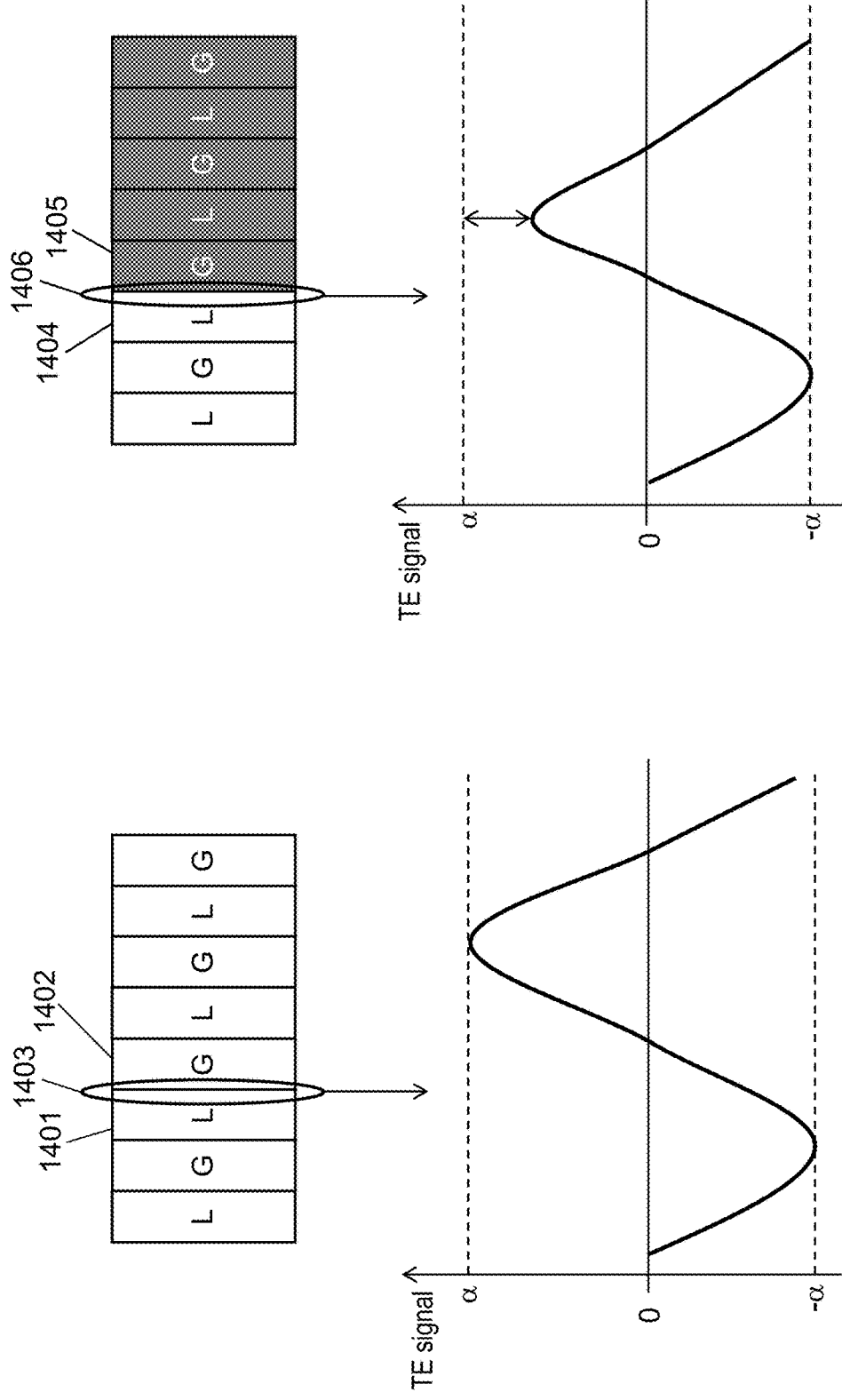
FIG. 19B - PRIOR ART ic Field
The present disclosure relates to an information recording method, an information recording device, and an information recording medium that enable recording of data on the information recording medium having an information recording surface capable of optically recording information on each of lands and grooves.

2. Description of the Related Art

Currently, as an information recording medium that stores video, data, and the like, many types of optical discs are used, such as a digital versatile disk (DVD) and Blu-ray (registered trademark) disc (hereinafter referred to as BD). Since these optical discs have high storage reliability compared with a hard disk drive (hereinafter referred to as a HDD) and a magnetic tape, applications are expanding from conventional recording applications of audiovisual (AV) data, such as video and voice, to prolonged storage of data, that is, applications for archiving data.

However, an optical disc has only about ⅓ of data storage capacity per volume compared with a HDD or magnetic tape. From a viewpoint of space efficiency during storage, development of a technology is desired that increases data storage capacity per volume without increasing cost of a disc, and energetic research and development has been continued.

Recently, a BDXL with a recording density of about 33.4 GB per layer, which has high recording density among BDs, has been on the market as an optical disc with the highest recording density per volume. These optical discs have storage reliability of 50 years or more, and have reliability of 10 times or more compared with about five years of life of a HDD from a viewpoint of long-term storage of data. Accordingly, it is possible to achieve both long-term storage reliability and low storage cost by moving data for long-term storage currently stored in a HDD to an optical disc for storage.

Moreover, from a viewpoint of power consumption, compared with a HDD that consumes electric power during data storage, an optical disc does not need electric power during storage, and can reduce $CO_2$ emissions as a green storage that gives consideration to global environment. Furthermore, in recent years, increase in power consumption in large-scale IT systems, such as a data center, has been a large problem; however, using an optical disc for archive applications allows reduction in power consumption.

For this purpose, in order to use an optical disc for archive applications, because of high cost reduction requirement for storage space such as a data center, improvement in recording density per volume is needed.

Technologies for improving recording density per volume of an optical disc include a land-groove recording-reproduction technology capable of improving recording density of a track, and a technology to narrow a track pitch, which is spacing between tracks.

The land-groove recording-reproduction technology is a technology used in DVD-RAMs. This is a technology to improve recording density of a track by recording data of an optical disc, which is currently recorded only on grooves or only on lands, on both grooves and lands. Usually, improvement in recording density of a track of an optical disc causes weaker diffracted light from grooves needed for performing trace control of grooves, which are tracks, with a light beam, disabling the light beam from tracing a track. When a wavelength of a laser beam used for the light beam with which the optical disc is irradiated is λ and a numerical aperture of a lens that forms the light beam is NA, limit spacing of grooves or lands, that is, limit track pitch L is as follows.

$L=(\lambda/NA) \times 0.6$

The track pitch smaller than the limit track pitch L disables detection of diffracted light from grooves and disables control to trace the track. For example, in a DVD of NA=0.6 and λ=650 nm, the limit track pitch L is 650 nm. A DVD-RAM achieves 615-nm track pitch and improves the track density by recording data on both lands and grooves (for example, refer to Unexamined Japanese Patent Publication No. H07-029185).

In addition, the technology to narrow the track pitch has also been employed during technical evolution from DVD to BD. In addition to 50% or more reduction of the track pitch from 0.74 μm for DVD to 0.32 μm for BD, further reduction of the wavelength of the laser beam and reduction of a size of a pit, which is a hole made on a recording surface, improves storage capacity from 4.7 GB for DVD to 25 GB or more for BD (for example, refer to "The Strategy of Panasonic for Blu-ray Disc", Nikkei Business Publications, Inc., 2006, page 30, chart 2-2).

Technology development is currently under way to improve the recording density per volume in an optical disc by further making the track pitch narrower than in BD or BDXL and by recording data on both lands and grooves. This technology development is expected to implement one optical disc with a capacity of 50 GB or more per layer on one side, and a capacity exceeding 150 GB in three layers on one side.

Generally, it is known that recording conditions of adjacent tracks have an influence on a tracking error (TE) signal and the like as the track pitch of an optical disc is reduced. Accordingly, when both lands and grooves of an optical disc are used for recording and the track pitch is reduced, the influence on the TE signal and the like further increases, which has an adverse influence on trace control of a track, recording quality, and the like.

FIG. 19A is a diagram illustrating change in an offset amount of the TE signal at an unrecorded-unrecorded boundary position during trace control of a track in a conventional optical disc that makes recording on grooves and lands of the optical disc. FIG. 19B is a diagram illustrating change in the offset amount of the TE signal at a recorded-unrecorded boundary position during trace control of a track in a conventional optical disc that makes recording on grooves and lands of the optical disc. In FIG. 19A, symmetric amplitude of a waveform of the TE signal is obtained at boundary position 1403 with adjacent unrecorded-unrecorded tracks 1401, 1402. In contrast, in FIG. 19B, the amplitude of the waveform of the TE signal obtained at boundary position 1406 with adjacent recorded-unrecorded tracks 1404, 1405 has significantly collapsed symmetry with changed TE offset amount. This means that, when the recording conditions of adjacent tracks differ from each other, symmetry of amplitude of the TE signal collapses.

When recording is made in a track of an optical disc in such a state, trace control of the track cannot be made optimally, the light beam cannot be applied to an optimal position, and recording quality may be significantly reduced to an unreproducible level. Furthermore, in a worst case, trace control of the track cannot be made at all, causing track jump or the like, which may ruin or crush data recorded on surrounding tracks. Although an optical disc allegedly has storage reliability of 50 years or more, it is apparent that a storage that fails to store data correctly cannot be used for applications including a data center.

SUMMARY OF THE INVENTION

The present disclosure has been made to solve such a problem, and an object of the present disclosure is to provide an information recording method, an information recording device, and an information recording medium capable of recording and reproducing information correctly in the information recording medium in which an area exists where recording quality cannot be secured depending on the recording conditions of adjacent tracks on both sides of a track to be recorded without causing performance degradation during recording.

An information recording method of the present disclosure is an information recording method for recording information on a write-once information recording medium. The information recording medium includes one or more recording layers, each of the recording layers being spiral-shaped on which a land track and a groove track are alternately repeated as recording tracks, each of the recording tracks being divided into blocks, each of the blocks being a minimum unit in which recording is performed. The information recording method of the present disclosure includes the steps of; recording the information on the information recording medium in a unit of each of the blocks; and controlling recording the information on the information recording medium. In the control step, switching is performed whether to perform recording in a block to be recorded in which the information is to be recorded next among the blocks based on recording conditions of the recording tracks adjacent on both sides of the block to be recorded. This allows the above-described object to be achieved.

Accordingly, in the information recording medium, such as an optical disc, having an information recording surface that allows recording of information optically in each of a land and a groove, the information recording medium capable of accumulating large data with increased track density, even if a condition occurs in which servo or signals cannot be appropriately controlled depending on recording conditions of adjacent tracks and data cannot be recorded correctly in the information recording medium, the information recording method, information recording device, and information recording medium according to the present disclosure can record data correctly in any case only by performing logical recording control with little reduction in recordable data capacity.

This allows not only increase in reliability, such as prevention of data loss, but also avoidance of degradation in performance caused by frequent alternate recording due to recording failure.

Also, since investment in development of new servo and signal control technology becomes unnecessary and an information recording medium like a large capacity optical disc and information recording-reproduction device can be developed and provided at a low price in a short period of time, the information recording medium like a large capacity optical disc and information recording-reproduction device can be introduced at an early stage in an archive storage field in which data is stored with high reliability for a long period of time, and indirect effects can also be expected, such as reduction in power consumption and reduction in $CO_2$ emissions in a data center.

BRIEF DESCRIPTION OF THE DRAWINGS

FIG. 10 is a diagram illustrating the recording constraint when recording is further performed in the partially recorded SRR in the optical disc according to the first exemplary embodiment;

FIG. 16 is a diagram illustrating the recording constraint caused by the recording learning in the OPC area of the optical disc according to the first exemplary embodiment;

FIG. 17 is a diagram illustrating the recording constraint caused by the recording learning in the OPC area of the optical disc according to the first exemplary embodiment;

FIG. 19A is a diagram illustrating change in an offset amount of a TE signal at an unrecorded-unrecorded boundary position during trace control of a track in a conventional optical disc that makes recording on grooves and lands of the optical disc; and FIG. 19B is a diagram illustrating change in the offset amount of the TE signal at a recorded-unrecorded boundary position during trace control of the track in the conventional optical disc that makes recording on grooves and lands of the optical disc.

DETAILED DESCRIPTION

An exemplary embodiment will be described in detail below with reference to the drawings as needed. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiment.

It is to be noted that the accompanying drawings and the following description are provided in order for a person skilled in the art to fully understand the present disclosure, and are not intended to limit the subject described in the appended claims.

First Exemplary Embodiment

An information recording method, information recording device, and information recording medium according to the present exemplary embodiment will be described below with reference to the drawings. Note that identical symbols are used to refer to identical components, and repeated description will be omitted. Also, the present exemplary embodiment describes, as an information recording medium, a write-once optical disc containing one or more recording layers capable of recording information only once on a block-by-block basis by way of example.

(1) Overall Structure of Optical Disc

Figure 1:
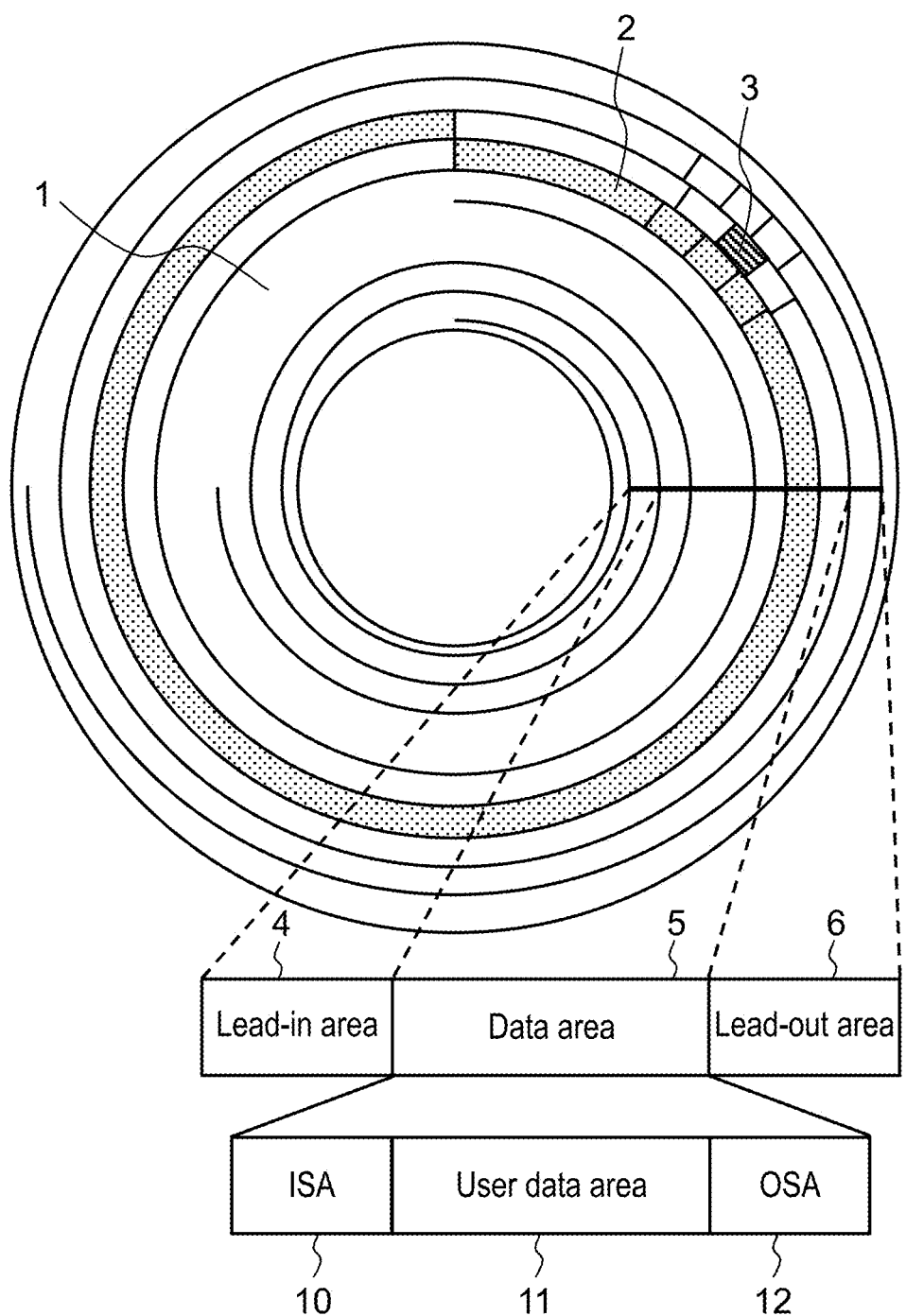
FIG. 1 is a diagram illustrating an overall structure of an optical disc according to a first exemplary embodiment.

FIG. 1 is a diagram illustrating an overall structure of an optical disc according to the present exemplary embodiment. In FIG. 1, disc-shaped optical disc 1 contains one or more recording layers capable of recording and reproducing information. In each of these recording layers, a large number of tracks 2 are spirally formed. Moreover, each of tracks 2 contains a large number of blocks 3 formed by finely dividing track 2. Address information that indicates a physical position on a disc (hereinafter referred to as a physical address) is assigned to track 2 by wobbling of grooves.

Here, a track pitch, which is a width of track 2, is 0.32 μm for BD, for example. Also, block 3 is a unit of error correction, and is a minimum unit in which recording and reproducing operations are performed. For example, for DVD, one block is one error correction code (ECC), and a size is 32 Kbytes. For BD, one block is one cluster, and a size is 64 Kbytes. When a unit of sector with a 2-Kbyte size is used, which is a minimum unit of data of an optical disc, one ECC is 16 sectors, and one cluster is 32 sectors.

Also, optical disc 1 is roughly divided into lead-in area 4, data area 5, and lead-out area 6. Moreover, data area 5 includes user data area 11, which records user data, and inner spare area (ISA) 10 and outer spare area (OSA) 12, which are spare areas including an alternate area and the like to be used for substitute recording of a defective area detected in user data area 11. Hereinafter, description of the spare area represents both ISA 10 and OSA 12.

Lead-in area 4 and lead-out area 6 each include an area that records management information mainly needed for performing recording and reproduction in optical disc 1. Furthermore, lead-in area 4 and lead-out area 6 act as a margin when an optical pickup of the information recording device to be described later accesses end of data area 5, such that the optical pickup can follow track 2 even if the optical pickup overruns.

Figure 2:
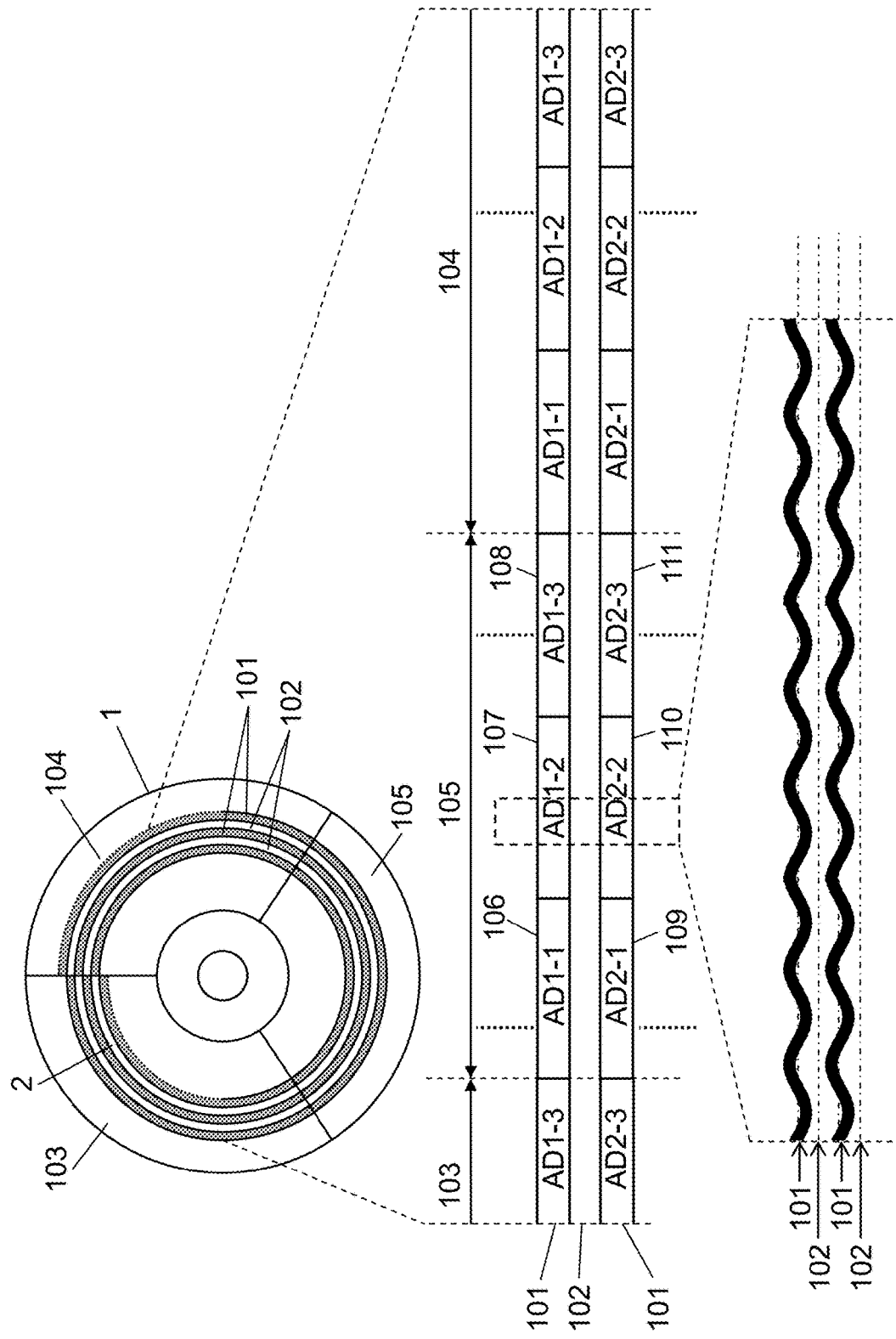
FIG. 2 is a diagram illustrating a detailed track structure of the optical disc according to the first exemplary embodiment.

FIG. 2 is a diagram illustrating a detailed structure of track 2 of optical disc 1 according to the present exemplary embodiment. In FIG. 2, in track 2 of optical disc 1, groove tracks 101, which are groove sections, and land tracks 102, which are land sections, are repeated alternately. Track 2 includes address groups 103, 104, 105 which are obtained by radially dividing track 2 into three groups. In address group 105, three independent physical addresses 106, 107, 108 are recorded on one groove track 101 by performing wobbling of the groove, and three independent physical addresses 109, 110, 111 different from the physical addresses 106, 107, 108 are recorded on another groove track 101 by performing wobbling of the groove. Address values increase sequentially in the group of physical addresses 106, 107, 108, and in the group of physical addresses 109, 110, 111. Address groups 103, 104 also have structures similar to the structure of address group 105.

Since the physical addresses are recorded by performing wobbling of the grooves, groove track 101 and land track 102 which are adjacent to the wobble are managed with the identical physical address of the wobble. The physical addresses recorded by wobbling are sequentially assigned in a predetermined direction, for example, in a radial direction of optical disc 1 from an inner periphery side to an outer periphery side in groove tracks 101 and land tracks 102. Since optical disc 1 allows access to a recording area in the recording track formed of groove tracks 101 and land tracks 102, it is possible to superimpose the recording data on an area identical to the physical address recorded by performing wobbling of the provided grooves.

A schematic view that enlarges part of physical addresses 107, 110 of track 2 is illustrated in a lower part of FIG. 2. In optical disc 1, the wobble is in phase between adjacent groove track 101 and groove track 101. This is because optical disc 1 is configured such that a length of one round of track 2 may be an integral multiple of a cycle of the wobble. Accordingly, a width of land track 102 sandwiched between two groove tracks 101 does not change, but maintains a constant width.

Direct access to optical disc 1 is made using the physical address recorded by the wobble after a servo of the information recording device to be described later traces the disc to desired groove track 101 or land track 102. Also, a virtual physical address is used to record, on optical disc 1, address information included in management information to be described later and information used for control by control software of an information recording-reproduction device to be described later, the virtual physical address being obtained by adding information about which of groove tracks and land tracks are used to record information to the physical address generated by the wobble.

(2) Structure of Areas in Optical Disc

Figure 3:
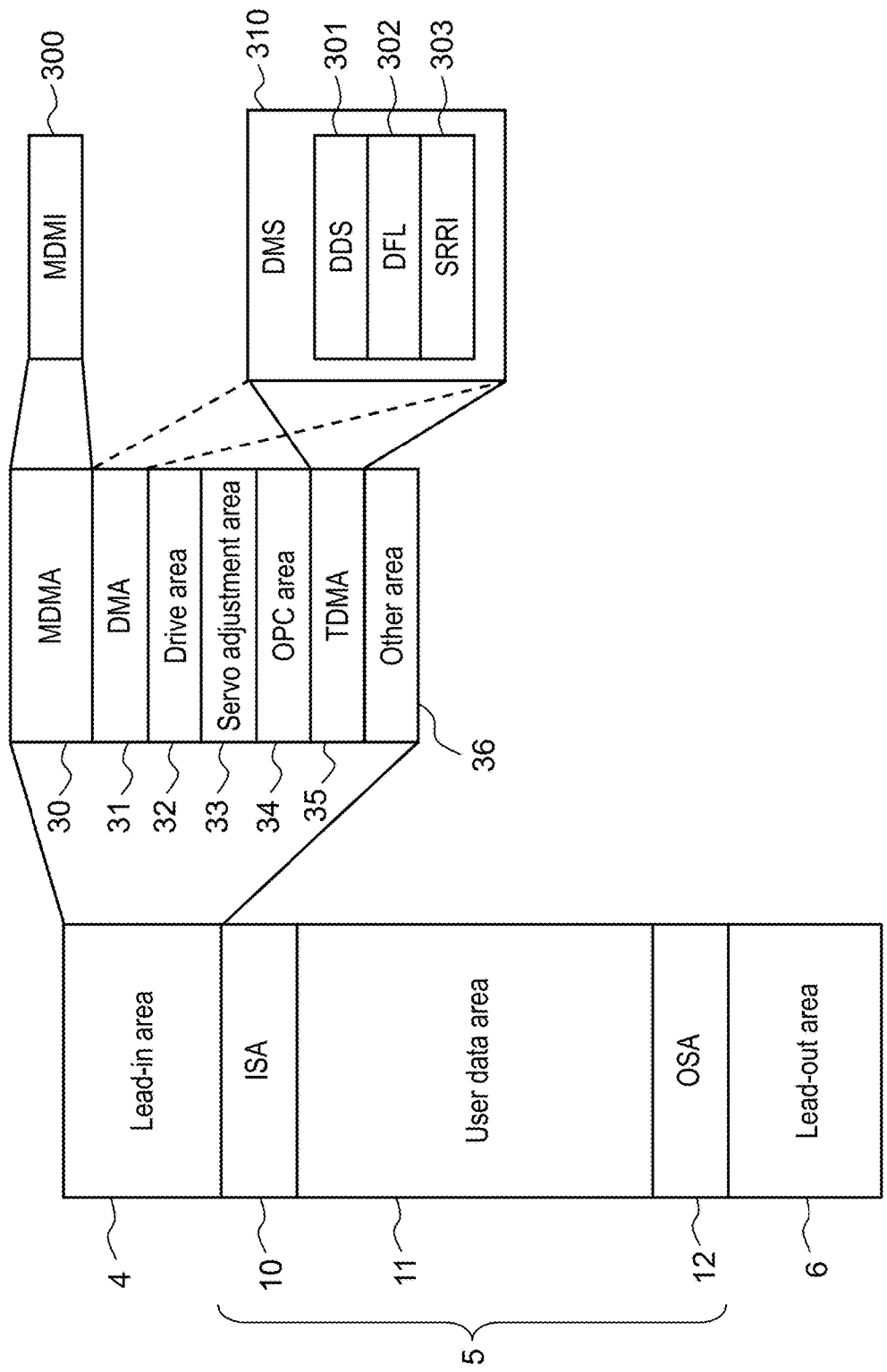
FIG. 3 is a diagram illustrating a detailed structure of areas in a predetermined recording layer of the optical disc according to the first exemplary embodiment.

FIG. 3 is a diagram illustrating a detailed structure of areas in a predetermined recording layer of optical disc 1 according to the present exemplary embodiment.

Data area 5 includes user data area 11, which records user data, and ISA 10, OSA 12, which are the spare areas including the alternate area and the like to be used for substitute recording of the defective area detected in user data area 11.

Lead-in area 4 is a management information area arranged on an inner periphery side of the predetermined recording layer of optical disc 1. Lead-in area 4 includes managed defect management area (MDMA) 30, defect management area (DMA) 31, drive area 32, servo adjustment area 33, optimum power control (OPC) area 34, temporary defect management area (TDMA) 35, and other area 36.

Lead-out area 6 is a management information area arranged on an outer periphery side of the recording layer of optical disc 1, and includes DMA 31 and the like. For example, data identical to data of DMA 31 of lead-in area 4 is recorded in DMA 31 of lead-out area 6 in a multiplex manner.

Lead-in area 4 and lead-out area 6 are areas in which the information recording-reproduction device to be described later makes recording-reproduction as necessary, and are areas in which a user cannot make direct recording-reproduction.

Next, the structure of lead-in area 4 will be described in detail. TDMA 35 is an area for transitionally recording disc management structure (DMS) 310 including management information of; disc definition structure (DDS) 301 including information on arrangement and size of ISA 10, OSA 12, which are the spare areas of optical disc 1, and information on recording modes; defect list (DFL) 302 including information such as the virtual physical addresses regarding defective blocks and alternate blocks; and sequential recording range information (SRRI) 303 for managing recording conditions of a recording zone in user data area 11 (sequential recording range (SRR)).

Here, the recording zone represents an area for continuous recording within user data area 11, and a user can define an arbitrary range at an arbitrary position. If the user does not define the area for continuous recording, entire user data area 11 of optical disc 1 becomes one recording zone.

Also, in write-once optical disc 1, once recorded DMS 310 cannot be updated by overwriting. Accordingly, DMS 310 is sequentially recorded transitionally in a predetermined direction of TDMA 35, for example, from an inner periphery side to an outer periphery side sequentially. In other words, DMS 310 that exists at a boundary position between a recorded area and an unrecorded area in TDMA 35 is latest DMS 310.

Note that TDMA 35 is recorded not only in lead-in area 4 but also in the spare area such as ISA 10 or OSA 12 discretely in some cases.

Figure 4A:
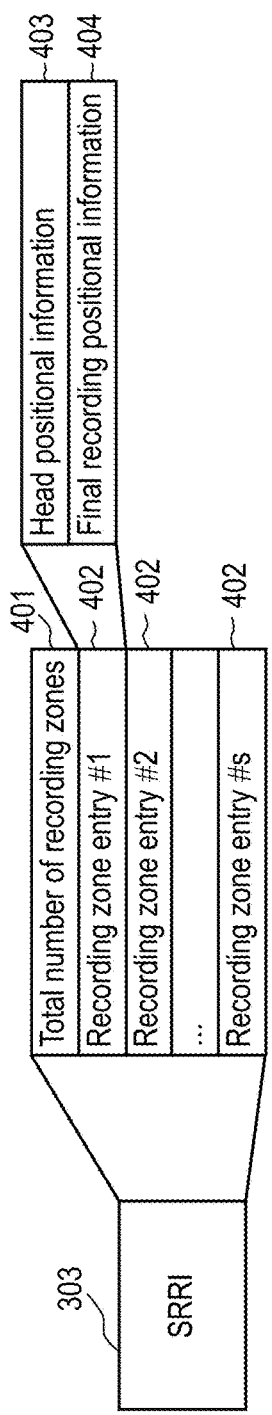
FIG. 4A is a diagram illustrating one example of SRRI according to the first exemplary embodiment.
Figure 4B:
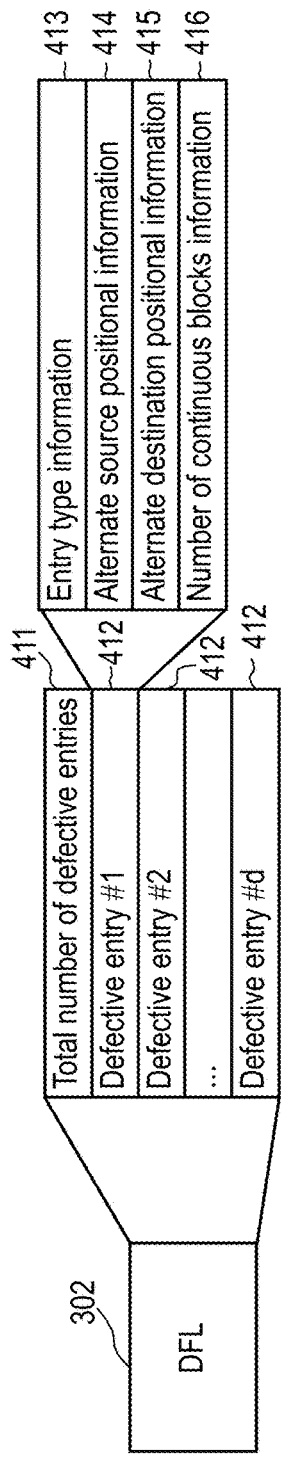
FIG. 4B is a diagram illustrating one example of DFL according to the first exemplary embodiment.
Figure 4C:
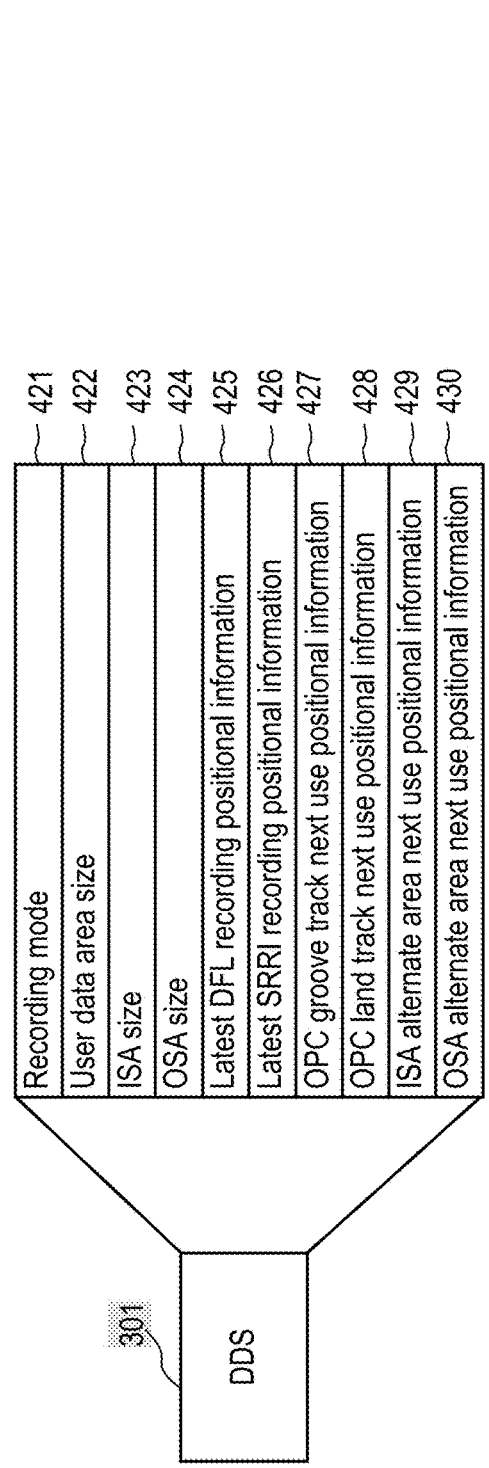
FIG. 4C is a diagram illustrating one example of DDS according to the first exemplary embodiment.

Next, detailed structure of DMS 310 will be described. FIG. 4A is a diagram illustrating one example of SRRI according to the present exemplary embodiment, FIG. 4B is a diagram illustrating one example of DFL according to the present exemplary embodiment, and FIG. 4C is a diagram illustrating one example of DDS according to the present exemplary embodiment.

In FIG. 4A, SRRI 303 includes recording zone entry 402, which is information regarding the recording zone called SRR that is a recording range for making write-once recording, and total number of recording zones 401, which is a number of recording zone entries 402. SRRI 303 includes a total of s recording zone entries 402 from recording zone entry 402 #1 to recording zone entry 402 #s (s is an integer equal to or larger than 1).

Note that if the user does not define the area for continuous recording, entire user data area 11 becomes one recording zone, the total number of recording zones in SRRI 303 is one, and only one recording zone entry 402, that is, recording zone entry 402 #1 is included.

Recording zone entry 402 includes head positional information 403, which is information regarding a head position of the recording zone, and final recording positional information 404, which indicates a final position at which the user data is recorded in the recording zone.

In FIG. 4B, DFL 302 includes defective entry 412, which is information regarding the defective block and the alternate block in response to a rewriting request from a pseudo-overwrite (POW) instruction, and total number of defective entries 411, which is a number of defective entries 412. DFL 302 includes a total of d defective entries from defective entry 412 #1 to defective entry 412 #d (d is an integer greater than or equal to 0).

Note that if neither defective block nor alternate block exists in DFL 302, total number of defective entries 411 is zero, and defective entry 412 does not exist.

Here, regarding POW, in a write-once optical disc that allows recording only once, in response to a recording request in a recorded area, by alternate recording of data in user data area 11 or the spare area, and by registering the entry regarding the alternate recording as defective entry 412 in DFL 302, POW refers to reading data of an alternate destination and pretending as if data is overwritten in the recorded area.

Defective entry 412 includes entry type information 413, alternate source positional information 414, alternate destination positional information 415, and number of continuous blocks information 416. Alternate source positional information 414 and alternate destination positional information 415 are virtual physical addresses. Entry type information 413 is identification information that indicates whether the block indicated by alternate source positional information 414 is an "unrecorded defective block" containing an unrecorded section.

Note that entry type information 413 may further include identification information that indicates whether an alternate destination block has been assigned to the block which is the alternate source, such as the defective block indicated by defective entry 412, and identification information that indicates whether the block is a block for recording valid user data.

Alternate source positional information 414 represents an original position of a block that is a source of alternation, such as a defective block. Alternate destination positional information 415 represents a position of the alternate block which is the destination of alternation of the defective block. Number of continuous blocks information 416 represents, when the defective blocks and alternate blocks continue, a number of continuous defective blocks and a number of continuous alternate blocks.

Here, the detailed structure of defective entry 412 will be described. A conventional defective entry is 8-byte information including the virtual physical address that indicates the alternate source position and the virtual physical address that indicates the alternate destination position. However, since a little less than 30 bits is used in general by the virtual physical address, for example, since BDXL uses 27 bits, when information such as identification information is included, 64 bits or 8 bytes is a limit. A conventional method for managing continuous defective blocks uses a method for representing the continuous defective blocks, for example, by using two defective entries that indicate head and end of the continuous area. Accordingly, at least two defective entries are consumed to indicate the continuous defective blocks.

Figure 5:
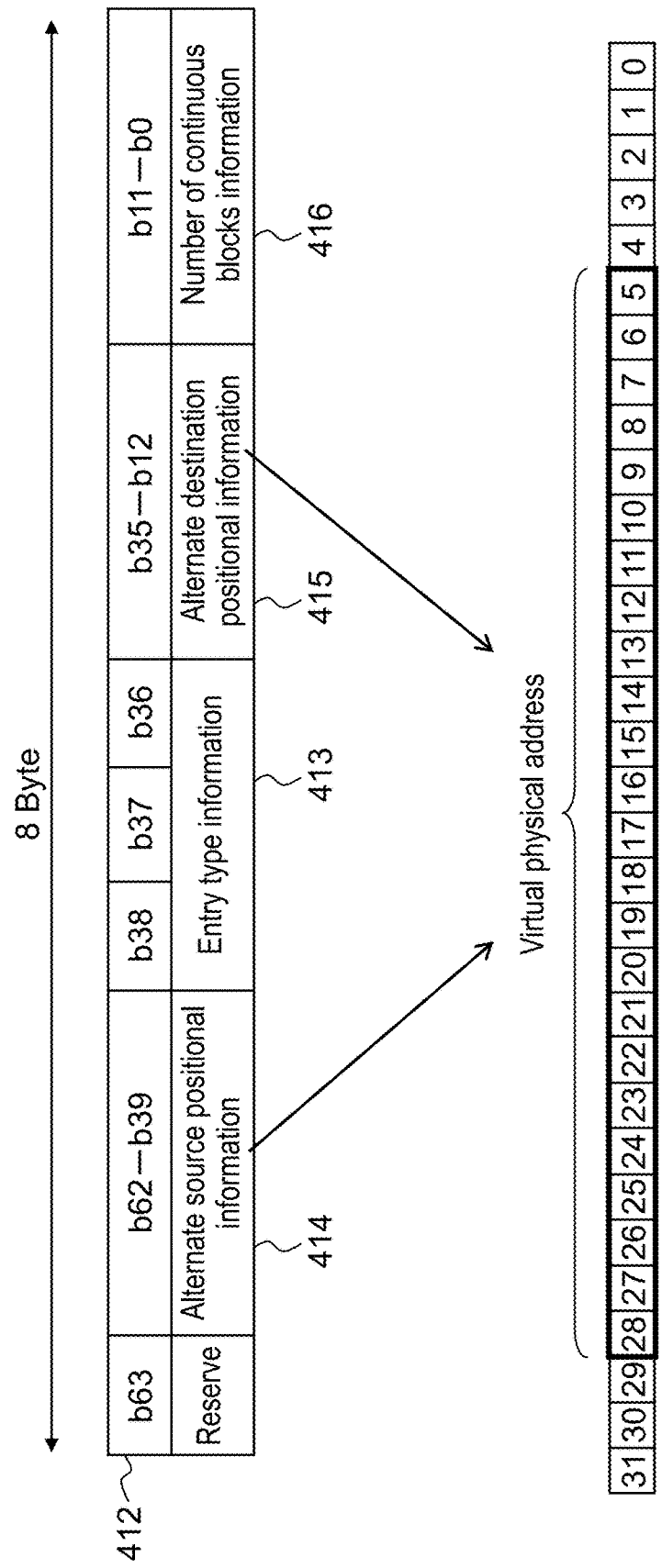
FIG. 5 is a diagram illustrating a detailed structure of a defective entry according to the first exemplary embodiment.

FIG. 5 is a diagram illustrating the detailed structure of defective entry 412 according to the present exemplary embodiment. A size of defective entry 412 is 8 bytes. When compared with the conventional defective entry, in defective entry 412 according to the present exemplary embodiment, special ideas are put into alternate source positional information 414 and alternate destination positional information 415, each of which is positional information.

Specifically, although the virtual physical address is 2-KB sector-unit address information, since defect management and alternation processing are made in 32-sector 64-KB block unit, it is assured that lower-order five bits of the virtual physical address always have an identical value. Accordingly, for example, when 29 bits of from b0 to b28 are used as valid information of the virtual physical address, as illustrated in FIG. 5, each of alternate source positional information 414 and alternate destination positional information 415 stores 24-bit information of from b5 to b28, excluding fixed-value lower-order five bits of from b0 to b4 and reserve higher-order three bits of from b29 to b31 for future extension which is not used as address information.

That is, a value to be used is obtained by masking higher-order three bits of the virtual physical address and shifting five bits rightward. In this way, a total of 16-bit empty bits are secured. As illustrated in FIG. 5, including bits excluding bits used as entry type information 413 from here, 12-bit number of continuous blocks information 416 can be assigned. Also, this number of continuous blocks information 416 is a value obtained by subtracting 1 from the actual number of continuous blocks. Specifically, for ordinary single-block defective block, 0 is set as number of continuous blocks information 416. In this way, one defective entry 412 can handle up to 4096 continuous blocks, and compared with the conventional method, it is possible to control an amount of defective entry 412 used, that is, the size of DFL 302 to be small. Since the size of DFL 302 becomes small, an amount of consumption of TDMA 35 or the like can be controlled.

Returning to description of the detailed structure of DMS 310, in FIG. 4C, DDS 301 includes recording mode 421, user data area size 422, ISA size 423, OSA size 424, latest DFL recording positional information 425, latest SRRI recording positional information 426, OPC groove track next use positional information 427, OPC land track next use positional information 428, ISA alternate area next use positional information 429, and OSA alternate area next use positional information 430.

Recording mode 421 is information that indicates whether optical disc 1 is in a logical overwriting recording mode or in a continuous recording mode. User data area size 422 is information regarding the size of user data area 11. ISA size 423 is information regarding the size of ISA 10. OSA size 424 is information regarding the size of OSA 12. Latest DFL recording positional information 425 is information that indicates the position at which latest DFL 302 of DMS 310 is recorded. Latest SRRI recording positional information 426 is information that indicates the position at which latest SRRI 303 of DMS 310 is recorded. OPC groove track next use positional information 427 is information that indicates next available position of the groove tracks in OPC area 34. OPC land track next use positional information 428 is information that indicates next available position of the land tracks in OPC area 34. ISA alternate area next use positional information 429 is information that indicates next available position in ISA 10. OSA alternate area next use positional information 430 is information that indicates next available position in OSA 12.

Although not illustrated in FIG. 4C, for example, as information that indicates next available position in ISA 10, OSA 12, which are spare areas, in a similar manner to OPC area 34, information that indicates the next available position in each of the groove tracks and the land tracks may be included.

Returning to description of lead-in area 4 of FIG. 3, OPC area 34 is an area in which the information recording-reproduction device to be described later that makes recording-reproduction on optical disc 1 performs recording learning for determining a write strategy, such as optimal recording power for recording and mark length. Since there is a difference in optimum recording power and the like between the groove tracks and the land tracks, basically, OPC area 34 is secured such that recording learning can be implemented individually in each of the groove tracks and the land tracks.

Servo adjustment area 33 is an area for making servo adjustment, such as focus and tracking, for typical recording patterns which may exist on optical disc 1, and for example, arbitrary data is recorded at timing when first recording is made on optical disc 1, for example, at a time of formatting.

Drive area 32 is an area in which the information recording-reproduction device to be described later that records information on optical disc 1 may leave arbitrary information.

DMA 31 is an area for recording DMS 310, in a similar manner to TDMA 35. In this area, for example, latest DMS 310 in TDMA 35 is recorded during processing for disabling optical disc 1 to perform subsequent recording called finalization. DMA 31 may be arranged in a multiplex manner, for example, two DMAs 31 in lead-in area 4 and two DMAs 31 in lead-out area 6.

Regarding TDMA 35 and drive area 32, sequential recording is performed first in the groove tracks included in each area, and after the groove tracks are used up, if further necessary, recording is performed in the land tracks. In contrast, in OPC area 34, it is assumed that, before the groove tracks are used up, it is necessary to perform recording in the land tracks.

MDMA 30 is an area for mainly recording managed defect management information (MDMI) 300 for managing the recording condition, such as defective blocks in the management information area, such as lead-in area 4 and lead-out area 6. In MDMA 30, data is recorded by using only recording tracks of either one of the groove tracks and land tracks which exist in the area of MDMA 30. MDMI 300 is information for supporting a recording constraint of optical disc 1 to be described later. For example, in lead-in area 4, lead-out area 6, or the like, in block 3 in which recording fails during recording, MDMI 300 is information for managing the recording conditions of the unrecorded defective block that has become completely unrecorded or part of the block has become unrecorded.

Figure 6:
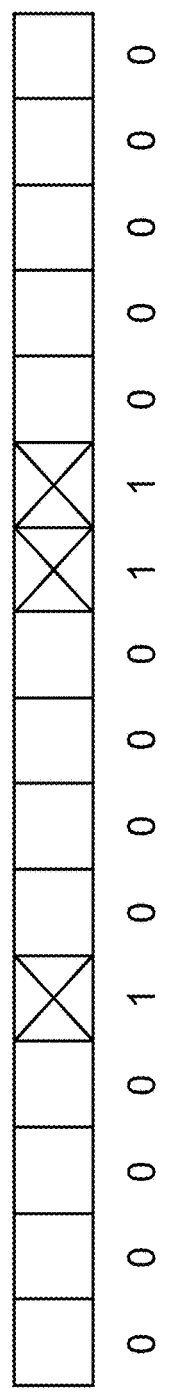
FIG. 6A is a diagram illustrating one example of MDMI according to the first exemplary embodiment.
FIG. 6B is a diagram illustrating another example of MDMI according to the first exemplary embodiment.
FIG. 6C is a diagram illustrating still another example of MDMI according to the first exemplary embodiment.

FIG. 6A is a diagram illustrating one example of MDMI 300 according to the present exemplary embodiment, FIG. 6B is a diagram illustrating another example of MDMI 300 according to the present exemplary embodiment, and FIG. 6C is a diagram illustrating still another example of MDMI 300 according to the present exemplary embodiment.

MDMI 300 may be table information that lists the virtual physical address of the unrecorded defective block, as illustrated in FIG. 6A. MDMI 300 may be table information of a list including the virtual physical address, which is a head position of the unrecorded defective area, and a number of continuous blocks, which is the number of unrecorded defective blocks that continuously exist from the head position, as illustrated in FIG. 6B. Alternatively, MDMI 300 may be bit map information that associates, with one bit, one block of the area to be managed, such as lead-in area 4 and lead-out area 6, as illustrated in FIG. 6C.

Note that when MDMI 300 is a list as illustrated in FIG. 6B, MDMI 300 may have a data structure similar to the data structure of defective entry 412 of DFL 302 described above. Specifically, for example, as the head positional information of the unrecorded defective area, a value that can be used may be obtained by performing mask of higher-order three bits of the virtual physical address and further performing five-bit rightward shift, and as the number of continuous clusters, a value obtained by subtracting 1 from the actual number of continuous blocks may be used.

Note that when TDMA 35 is secured in ISA 10 or OSA 12, the unrecorded defective block of TDMA 35 is managed using MDMI 300. Also, regarding the alternate area used as a substitute block for the defective block of user data area 11 secured in ISA 10 or OSA 12, although the block used as an alternate recording destination of data of user data area 11 is an area managed using DFL 302, the unrecorded defective block, which is block 3 that does not correctly record user data, is managed using MDMI 300. Note that the unrecorded defective block in the alternate area within the spare area may be managed using DFL 302.

Although description has been provided that MDMI 300 is recorded in MDMA 30, MDMI 300 is not limited to this example. For example, even if MDMI 300 is recorded in TDMA 35 in a similar manner to DFL 302 or SRRI 303, similar effect can be obtained. In this case, MDMA 30 is unnecessary in optical disc 1.

(3) Configuration of Information Recording-Reproduction Device

Next, the following describes an optical disc drive that is an information recording-reproduction device for performing recording-reproduction of optical disc 1 according to the present exemplary embodiment.

Figure 7:
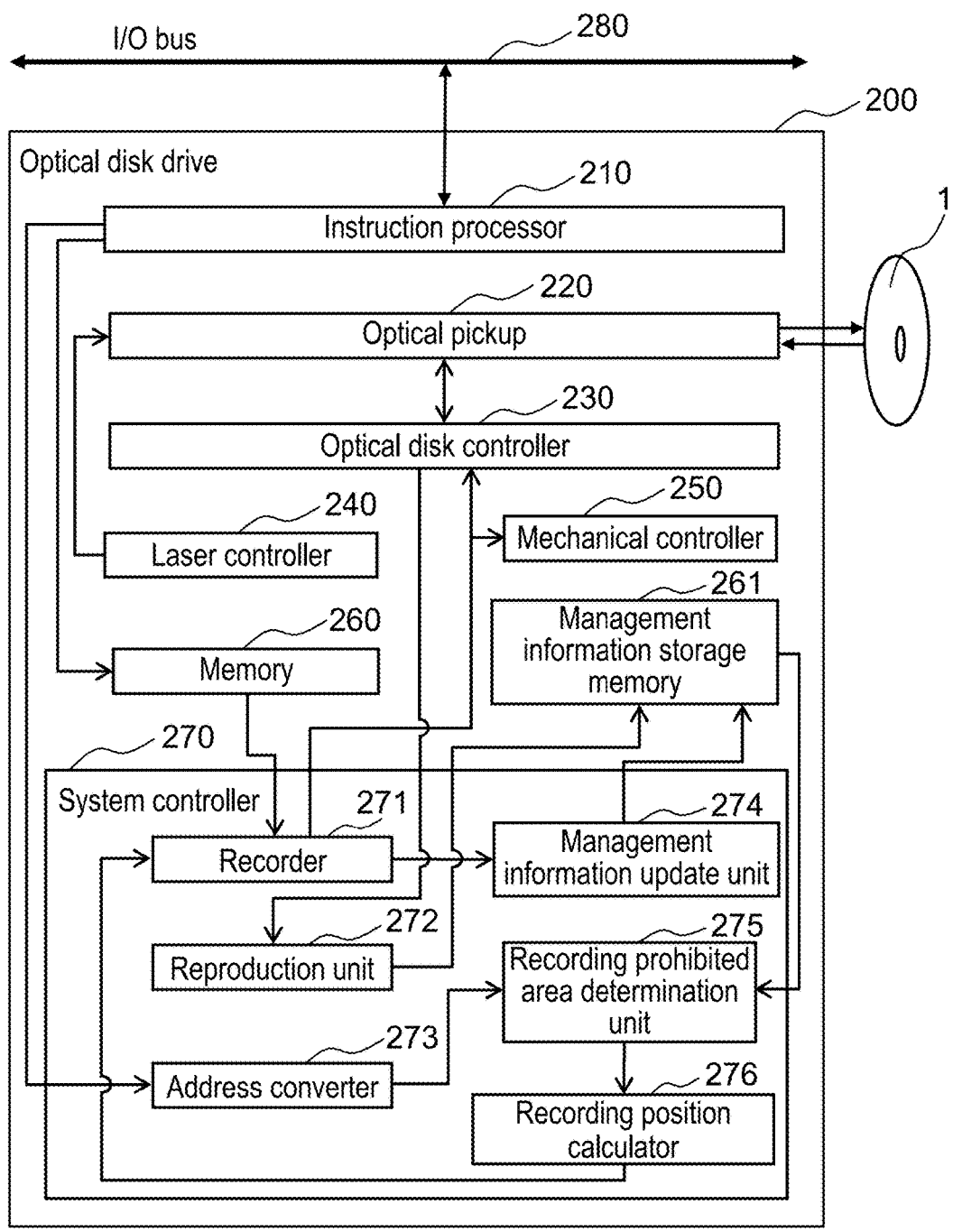
FIG. 7 is a block diagram of an optical disc drive according to the first exemplary embodiment.

FIG. 7 is a block diagram of optical disc drive 200 according to the present exemplary embodiment.

Optical disc drive 200 is connected to an unillustrated higher level control apparatus via I/O bus 280. The higher level control apparatus is, for example, a host computer or a control controller.

Optical disc drive 200 includes instruction processor 210, optical pickup 220, optical disc controller 230, laser controller 240, mechanical controller 250, memory 260, management information storage memory 261, and system controller 270.

Instruction processor 210 processes various instructions requested from the higher level control apparatus in a form such as a command. Optical pickup 220 irradiates optical disc 1 with a laser beam for performing recording-reproduction. Optical disc controller 230 performs control of various signals and access to optical disc 1, conversion between the physical address indicated by the above-described wobble and the virtual physical address, and the like. Laser controller 240 controls laser power that is output from optical pickup 220, and the like. Mechanical controller 250 moves optical pickup 220 to a destination position, or performs servo control. Memory 260 manages recorded and reproduced user data and other information. Management information storage memory 261 stores management information for reading and recording latest DDS 301, DFL 302, and SRRI 303 from TDMA 35 or DMA 31, and for reading and recording latest MDMI 300 from MDMA 30. System controller 270 performs comprehensive control of overall system processing, such as recording-reproduction processing to and from optical disc 1.

System controller 270 includes recorder 271, which performs recording-reproduction of data including user data and management information, reproduction unit 272, address converter 273, which performs conversion between logical block address (LBA) used for request from the higher level control apparatus and the virtual physical address corresponding to the actual position on optical disc 1, management information update unit 274, which updates management information stored in management information storage memory 261, recording prohibited area determination unit 275, which determines whether block 3 at the virtual physical address position specified by the management information, such as DFL 302 and SRRI 303 stored in management information storage memory 261, is in the recording prohibited area, and recording position calculator 276 that calculates the position on optical disc 1 that records next data.

(4) Address Arrangement of Optical Disc

Next, address arrangement of optical disc 1 according to the present exemplary embodiment will be described.

Figure 8:
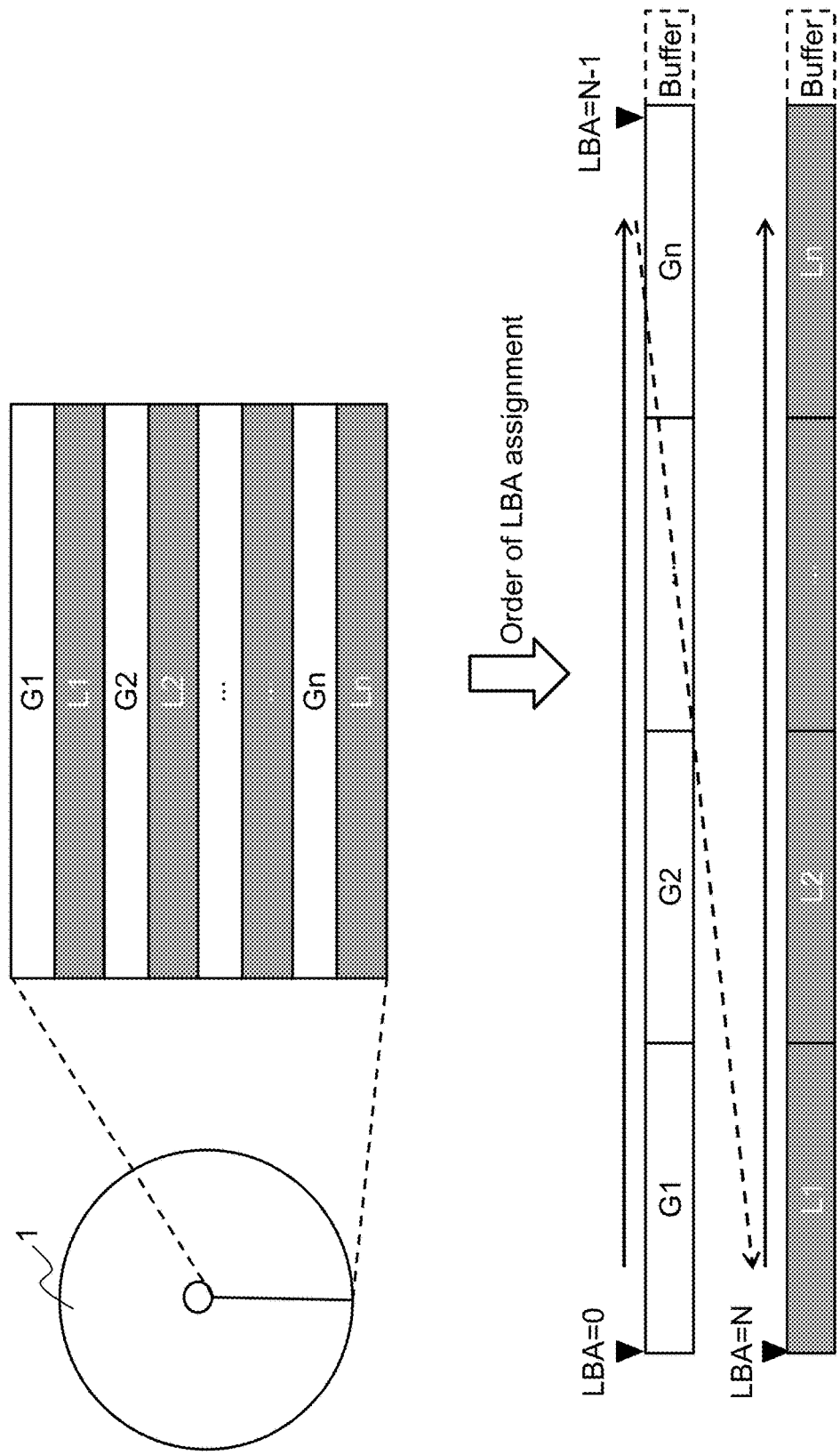
FIG. 8 is a diagram illustrating order of recording on the predetermined recording layer of the optical disc according to the first exemplary embodiment.

FIG. 8 is a diagram illustrating order of recording on the predetermined recording layer of optical disc 1 according to the present exemplary embodiment. Optical disc 1 is recordable on both the groove tracks and the land tracks. In optical disc 1 of FIG. 8, groove tracks G1, G2, . . . , Gn and land tracks L1, L2, . . . , Ln (n is an integer equal to or greater than 1) are alternately arranged in a predetermined direction, specifically from an inner periphery side to an outer periphery side. Optical disc drive 200 accesses optical disc 1 continuously, while causing optical disc 1 to rotate and causing optical pickup 220 to follow an identical type of track. LBA, which is a virtual logical address specified to a user, is basically assigned in order that allows continuous access. LBA is also assigned, for example, on a sector-by-sector basis, in a similar manner to the virtual physical address. Also, LBA and virtual physical address are associated with each other one-to-one in accordance with a predetermined rule.

In FIG. 8, LBA is continuously used in order in which a recording start end position of groove track G1 arranged on an innermost periphery side of user data area 11 is LBA=0, which is a head of the logical address, and LBA is sequentially assigned to all the groove tracks on the recording layer on a sector-by-sector basis. It is assumed that a total number of sectors in the groove tracks of the predetermined recording layer is N (N is an integer equal to or greater than 1). LBA=N, which is next to LBA=N−1 assigned to groove track Gn on an outermost periphery of user data area 11, becomes a head sector position in the start end block of land track L1 on an innermost periphery of user data area 11, and LBA is similarly assigned from LBA=N to land track Ln on an outermost periphery. That is, when recording is continuously performed from LBA=0, recording is first performed on the groove tracks, and after recording on all the groove tracks is completed, recording is continuously performed on the land tracks.

Note that under a recording constraint of optical disc 1 to be described later, even when a total number of available groove tracks included in user data area 11 is n and a total number of sectors is N, the total number of sectors of the land tracks available as LBA is not necessarily N. Specifically, regarding the land track on an outermost periphery of user data area 11, although the groove track on an outermost periphery of user data area 11, which is a first track of two adjacent tracks, has already been recorded, a second groove track on an innermost periphery of a head of OSA 12 may be unused and unrecorded. In this case, since the land track on an outermost periphery of user data area 11 becomes a recording prohibited area, a total number of available land tracks is n-1 or less, and the total number of sectors may also become smaller than N.

Regarding this, for example, in a case where a head groove track of lead-out area 6 adjacent to user data area 11 is used as a buffer track and the buffer track is set to be recorded when data is recorded in all the groove tracks in user data area 11, the total number of groove tracks included in user data area 11 is n and the total number of sectors is N, then the total number of available land tracks included in user data area 11 can also be n, and the total number of sectors can also be N.

Alternatively, in a case where a dummy area like a buffer area of one or more tracks is provided between user data area 11 and ISA 10, and between user data area 11 and OSA 12, when the total number of groove tracks included in user data area 11 is n and the total number of sectors is N, then the total number of available land tracks included in user data area 11 can be n, and the total number of sectors can be N.

When optical disc 1 includes three recording layers, LBA is continuously assigned in the following order: groove track of the first recording layer, land track of the first recording layer, groove track of the second recording layer, land track of the second recording layer, groove track of the third recording layer, and land track of the third recording layer. For example, when the total number of available sectors in one recording layer is N, LBA assigned to the first layer is LBA=0 to LBA=N-1, LBA assigned to the second layer is LBA=N to LBA=2N-1, and LBA assigned to the third layer is LBA=2N to LBA=3N-1.

Note that LBA is first assigned to the groove tracks in the above description, but LBA may be first assigned to the land tracks.

Note that when optical disc 1 includes a plurality of recording layers, LBA may be first assigned to the groove tracks throughout all the recoding layers, and subsequently, LBA may be assigned to the land tracks in all the recording layers.

(5) Recording Constraint of Optical Disc

In optical disc 1 according to the present exemplary embodiment, a recording constraint is provided during recording, which is not provided in conventional optical discs. Specifically, in order to solve the problem described in FIG. 19A and FIG. 19B, the provided constraint is "the recording conditions of adjacent tracks on both sides of the block to be recorded need to be uniform". "The recording conditions of adjacent tracks on both sides of the block to be recorded are uniform" means that "adjacent tracks on both sides of the block to be recorded are all recorded or all unrecorded". When this constraint is put in another way, when the recording conditions of adjacent tracks of the track to be recorded are not uniform, the track is not defined as the track to be recorded and is not used, or the track is not used but alternate recording is performed in the alternate area included in the spare area for substitute recording.

Even if the recording conditions of adjacent tracks 2 on both sides differ from each other, optical disc drive 200 can read data, that is, can perform reproduction and movement of optical pickup 220, that is, seek, etc.

(6) Recording Control of User Data Area in Optical Disc

In the present exemplary embodiment, two major patterns can be considered in which the recording conditions of adjacent tracks of the block to be recorded differ from each other when recording is performed in user data area 11 of optical disc 1. The first pattern is a case where user data area 11 of optical disc 1 is divided into a plurality of SRRs and recording is performed in each SRR randomly. The second pattern is a case where recording fails while the recording is performed, resulting in an unrecorded defective block, which is completely unrecorded or partially unrecorded.

The recording constraint for these two patterns will be described in detail below.

Figure 9:
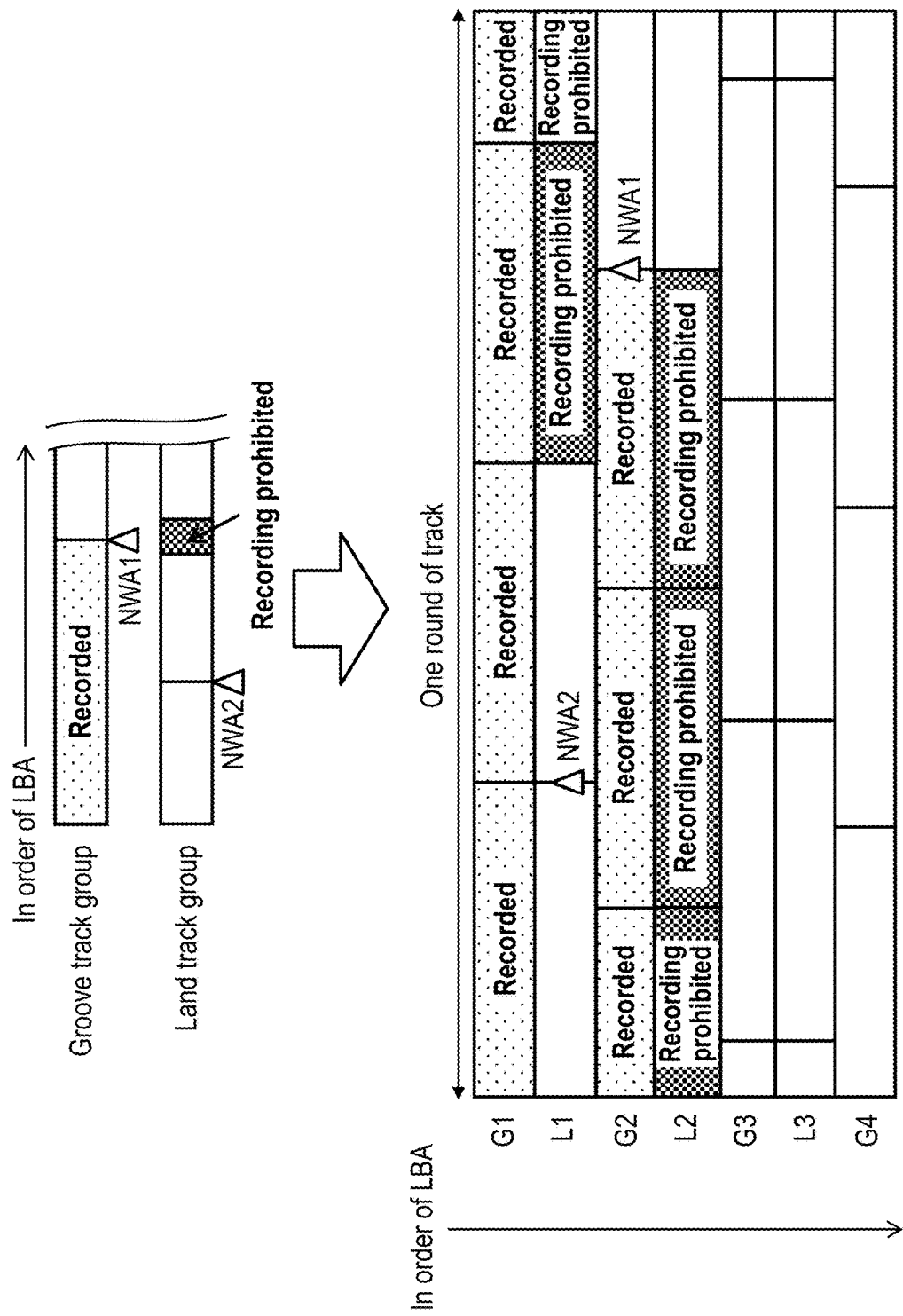
FIG. 9 is a diagram illustrating a recording constraint when additional recording is performed in SRR different from partially recorded SRR in the optical disc according to the first exemplary embodiment.
Figure 10:
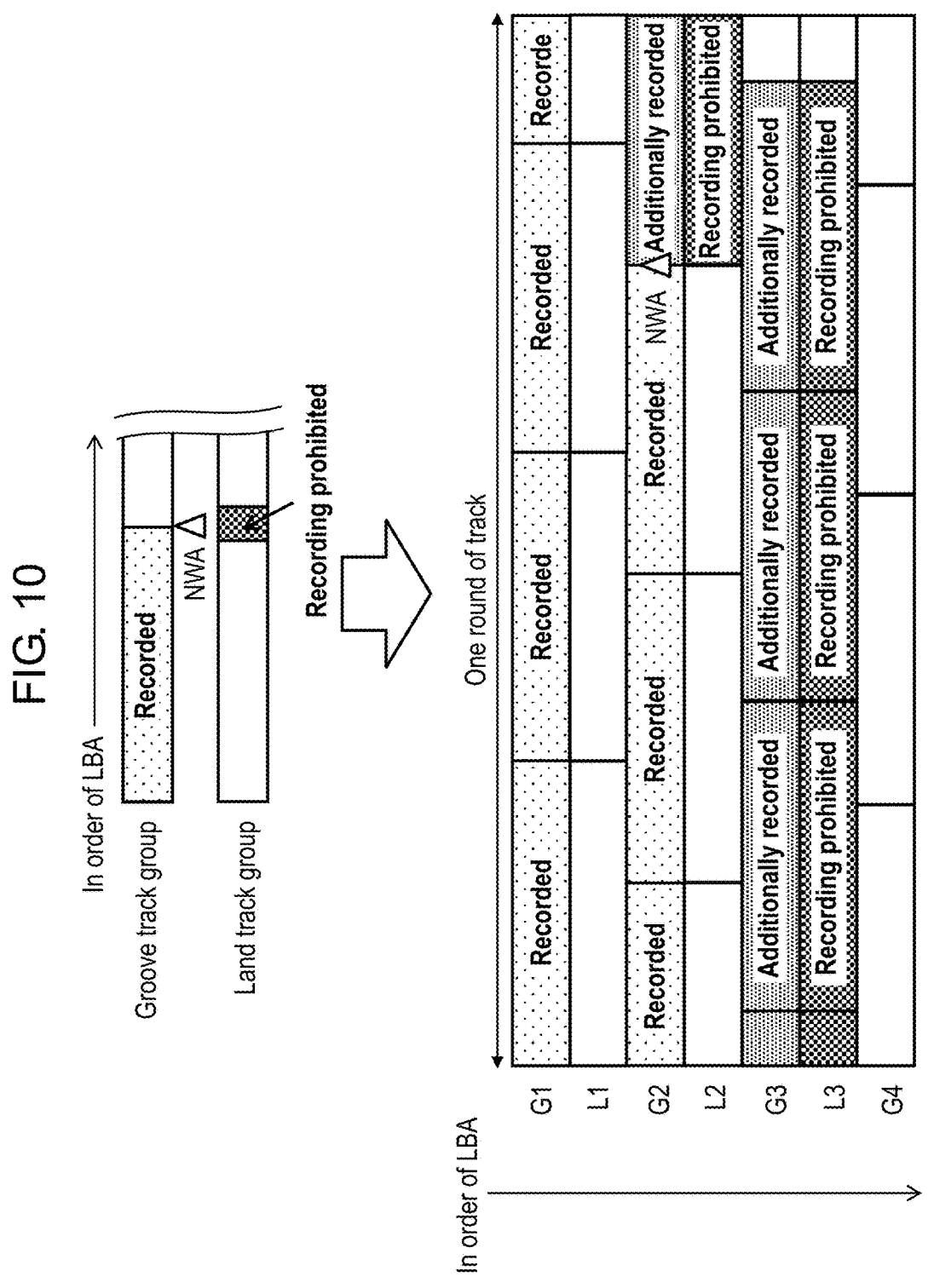

To begin with, the first pattern will be described in detail. FIG. 9 is a diagram illustrating the recording constraint when additional recording is performed in SRR different from partially recorded SRR in optical disc 1 according to the present exemplary embodiment. FIG. 10 is a diagram illustrating the recording constraint when recording is further performed in the partially recorded SRR in optical disc 1 according to the present exemplary embodiment.

FIG. 9 illustrates the recording condition when data of a predetermined amount is recorded from LBA=0 in order of assignment of LBA first in the groove tracks of optical disc 1. Specifically, recording is started in groove track G1, and recording is finished in a predetermined block of groove track G2.

When additional data is recorded in write-once optical disc 1, recording is first performed at an additional recording position called next writable address (NWA) in SRR. SRR can be set at an arbitrary unrecorded LBA position. Two SRRs exist in optical disc 1. The first SRR has been partially recorded, and NWA is set at position NWA1 indicated by a triangle mark in groove track G2. The second SRR has not been recorded, and NWA is set at position NWA2 indicated by a triangle mark in land track L1. In FIG. 9, additional recording is performed from NWA2 among two NWAs. In land track L1, there exist areas in nonuniform recording conditions; a first track of groove tracks G1 and G2 on both sides has been recorded while a second track has been unrecorded. The blocks of land track L1 sandwiched between the two areas become the recording prohibited areas. In land track L2, there exist areas in nonuniform recording conditions; a first track of groove tracks G2 and G3 on both sides has been recorded and a second track has been unrecorded. The blocks of land track L2 sandwiched between the two areas become the recording prohibited areas. Accordingly, when recording is started from NWA in land track L1, a recording request is made soon in the block of the recording prohibited area. Data to be recorded in such a block of the recording prohibited area is alternately recorded in the alternate area of the spare area.

In a similar manner to FIG. 9, FIG. 10 also illustrates the recording condition when data of a predetermined amount is recorded from LBA=0 in order of assignment of LBA first in the groove tracks of optical disc 1. Specifically, only one SRR exists in optical disc 1, recording is started in groove track G1, and recording is finished in a predetermined block of groove track G2. Next, new recording is performed at NWA illustrated in FIG. 10, that is, from a recorded position of groove track G2 to a predetermined block of groove track G3. Then, in the land tracks, a section from the predetermined block of land track L2 to the predetermined block of land track L3 becomes the recording prohibited area.

As illustrated in FIG. 9 and FIG. 10, the recording prohibited area of the land tracks changes depending on change of the recording area in the groove tracks of optical disc 1. In other words, it is necessary to determine whether the block to be recorded in optical disc 1 is included in the recording prohibited area when recording is actually performed.

Here, determination whether the recording conditions of adjacent tracks on both sides of the block to be recorded are uniform can be made by actually reproducing the adjacent tracks and using a reproduced signal. However, actual reproduction of the adjacent tracks will reduce recording performance significantly. Accordingly, the determination whether the recording conditions of adjacent tracks on both sides of the block to be recorded are uniform is made by using management information that manages the recording condition of optical disc 1, for example, SRRI 303.

Determination whether the recording condition of user data area 11 is uniform is made by using SRRI 303. Specifically, in SRRI 303 of FIG. 4A, head positional information 403 and final recording positional information 404 are virtual physical addresses. The area from the virtual physical address indicated by head positional information 403 included in recording zone entry 402 to the virtual physical address indicated by final recording positional information 404 represents a recorded area. That is, the position that can be the recording prohibited area is a block that belongs to the track adjacent to the block indicated by the virtual physical address of each of head positional information 403 and final recording positional information 404 in recording zone entry 402. The virtual physical address position of each of these blocks can be uniquely calculated by predetermined calculation using information such as a number of blocks included in the track corresponding to the virtual physical address, with reference to the virtual physical addresses indicated by each of head positional information 403 and final recording positional information 404. In other words, when a recording request in a block indicated by a certain LBA is received, determination is made whether the virtual physical addresses of the blocks that belong to adjacent tracks of the block corresponding to the LBA agree with the virtual physical addresses indicated by head positional information 403 and final recording positional information 404 on all the recording zones included in SRRI 303. Then, when the determination is made that the virtual physical addresses do not agree with each other, it is determined that the block is not the recording prohibited area, and thus recording is performed in the requested block. When the determination is made that the virtual physical addresses agree with each other, it is determined that the block is the recording prohibited area, and the recording data is alternately recorded in the alternate area which is a substitute area included in the spare area. By performing control in this way, even when a recording request is received in any LBA from the higher level control apparatus, it is possible to perform control so as not to perform recording in the recording prohibited area.

Next, a recording operation of optical disc drive 200 in user data area 11 will be described. Optical disc drive 200 is activated when optical disc 1 is installed. Optical disc drive 200 reads the latest management information, for example, SRRI 303, DFL 302, DDS 301 from optical disc 1 through optical pickup 220, optical disc controller 230, and reproduction unit 272 of system controller 270 to management information storage memory 261.

Figure 11:
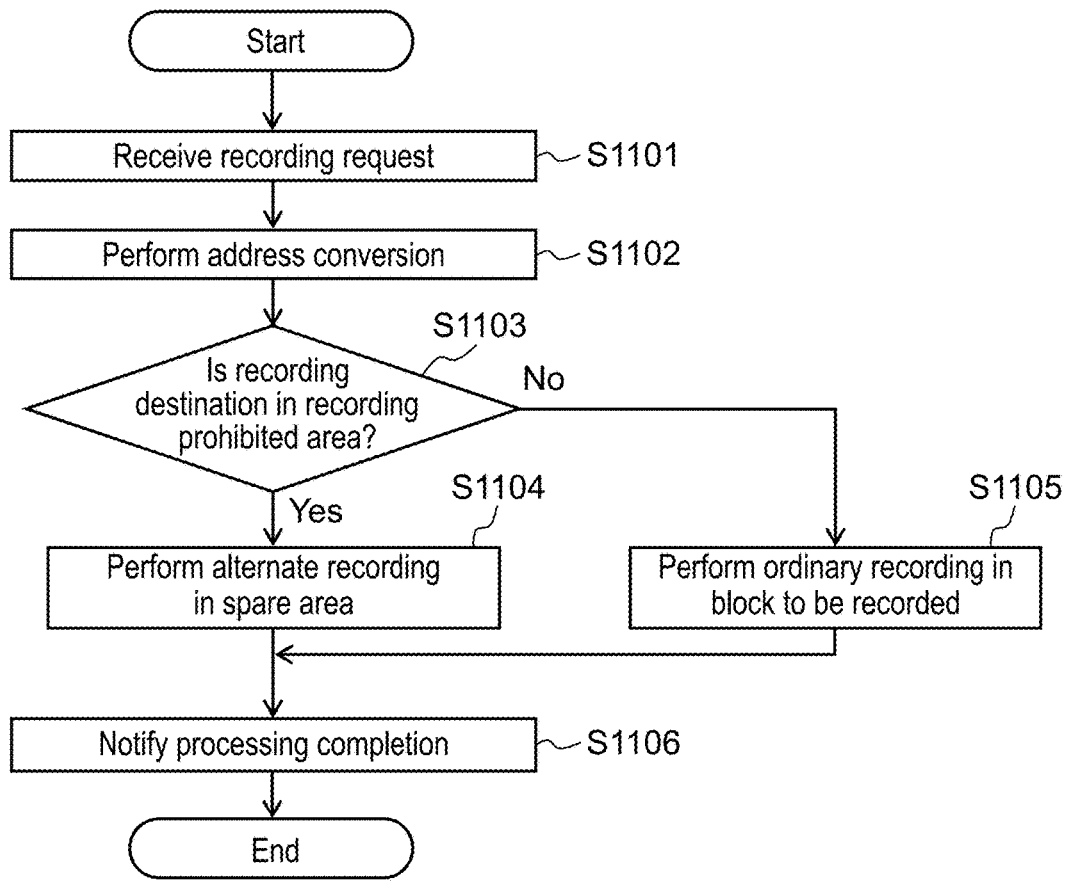
FIG. 11 is a flowchart illustrating one example of a recording sequence when the optical disc drive performs recording in a user data area according to the first exemplary embodiment.

FIG. 11 is a flowchart illustrating one example of a recording sequence when optical disc drive 200 performs recording in user data area 11.

(Step S1101)

Optical disc drive 200 receives the recording request from the higher level control apparatus. Specifically, in optical disc drive 200, instruction processor 210 receives a recording request command notified via I/O bus 280 from the higher level control apparatus, acquires LBA of which recording is requested, and then stores in memory 260 the user data of which recording is instructed.

(Step S1102)

Optical disc drive 200 performs address conversion of LBA. Specifically, address converter 273 included in system controller 270 calculates the corresponding virtual physical address from LBA received in step S1101. Note that the block indicated by the virtual physical address calculated here is referred to as a block to be recorded.

(Step S1103)

Optical disc drive 200 determines whether the block to be recorded is the recording prohibited area. Specifically, recording prohibited area determination unit 275 included in system controller 270 acquires the virtual physical addresses indicated by head positional information 403 and final recording positional information 404 from corresponding recording zone entry 402 among recording zone entry 402 which are all the recording zones included in latest SRRI 303 stored in management information storage memory 261. Then, based on the virtual physical addresses indicated by head positional information 403 and final recording positional information 404, recording prohibited area determination unit 275 calculates the virtual physical addresses of all the blocks which should be defined as the recording prohibited areas in track 2 adjacent thereto.

Then, recording prohibited area determination unit 275 determines whether the virtual physical addresses of the blocks which should be the recording prohibited areas agree with the virtual physical address of the block to be recorded calculated in step S1102. When a result of the determination is "agree" (Yes), processing goes to step S1104, whereas when the result is "not agree" (No), processing goes to step S1105.

Note that the calculation of the recording prohibited area may be performed roughly to some extent. Specifically, for example, it may be determined that all the blocks included in two adjacent tracks of the track in which a recorded area-unrecorded area boundary exists are the recording prohibited areas. In other words, when an area includes at least the recording prohibited block, a range wider than the above area may be determined as the recording prohibited area.

(Step S1104)

Optical disc drive 200 performs alternate recording in the spare area. Recording position calculator 276 calculates a next available block of the alternate area for substitute recording in the spare area as a recording destination. Specifically, recording position calculator 276 calculates the next available block of the alternate area in the spare area from ISA alternate area next use positional information 429 or OSA alternate area next use positional information 430 in DDS 301 stored in management information storage memory 261. Then, recorder 271 moves optical pickup 220 to a calculated position of the block by using mechanical controller 250 and provides an instruction to record the user data stored in memory 260, of which recording is instructed by the higher level control apparatus. Then, recorder 271 records the user data on optical disc 1 via optical disc controller 230 and optical pickup 220.

When the recording on optical disc 1 is completed, management information update unit 274 updates latest DDS 301 included in management information storage memory 261 to ISA alternate area next use positional information 429 or OSA alternate area next use positional information 430, which are next use positional information in the area assigned as the alternate destination. Furthermore, management information update unit 274 adds one new defective entry 412 to latest DFL 302 included in management information storage memory 261, and increases the total number of defective entries by one. Also, management information update unit 274 updates final recording positional information 404 in recording zone entry 402 of the zone to be recorded in SRRI 303.

Note that control is performed such that various pieces of management information updated here are recorded by recorder 271 in TDMA 35 of optical disc 1 at arbitrary timing until optical disc 1 is discharged from optical disc drive 200.

(Step S1105)

Optical disc drive 200 performs ordinary recording in the block to be recorded. Recorder 271 provides an instruction to record, in the calculated block, the user data of which recording is instructed by the higher level control apparatus, the user data being stored in memory 260. Recorder 271 then records the user data on optical disc 1 via optical disc controller 230 and optical pickup 220.

When the recording on optical disc 1 is completed, since a recording end position changes, management information update unit 274 updates final recording positional information 404 in recording zone entry 402 of the zone to be recorded in latest SRRI 303 included in management information storage memory 261.

Note that control is performed such that various pieces of management information updated here are recorded by recorder 271 in TDMA 35 of optical disc 1 at arbitrary timing until optical disc 1 is discharged from optical disc drive 200.

(Step S1106)

Optical disc drive 200 notifies processing completion to the higher level control apparatus. Specifically, instruction processor 210 notifies completion of the instruction processing instructed in step S1101 via I/O bus 280 to the higher level control apparatus.

Note that the notification of the processing completion may be performed in step S1101 when acquisition of the user data is completed.

Figure 12:
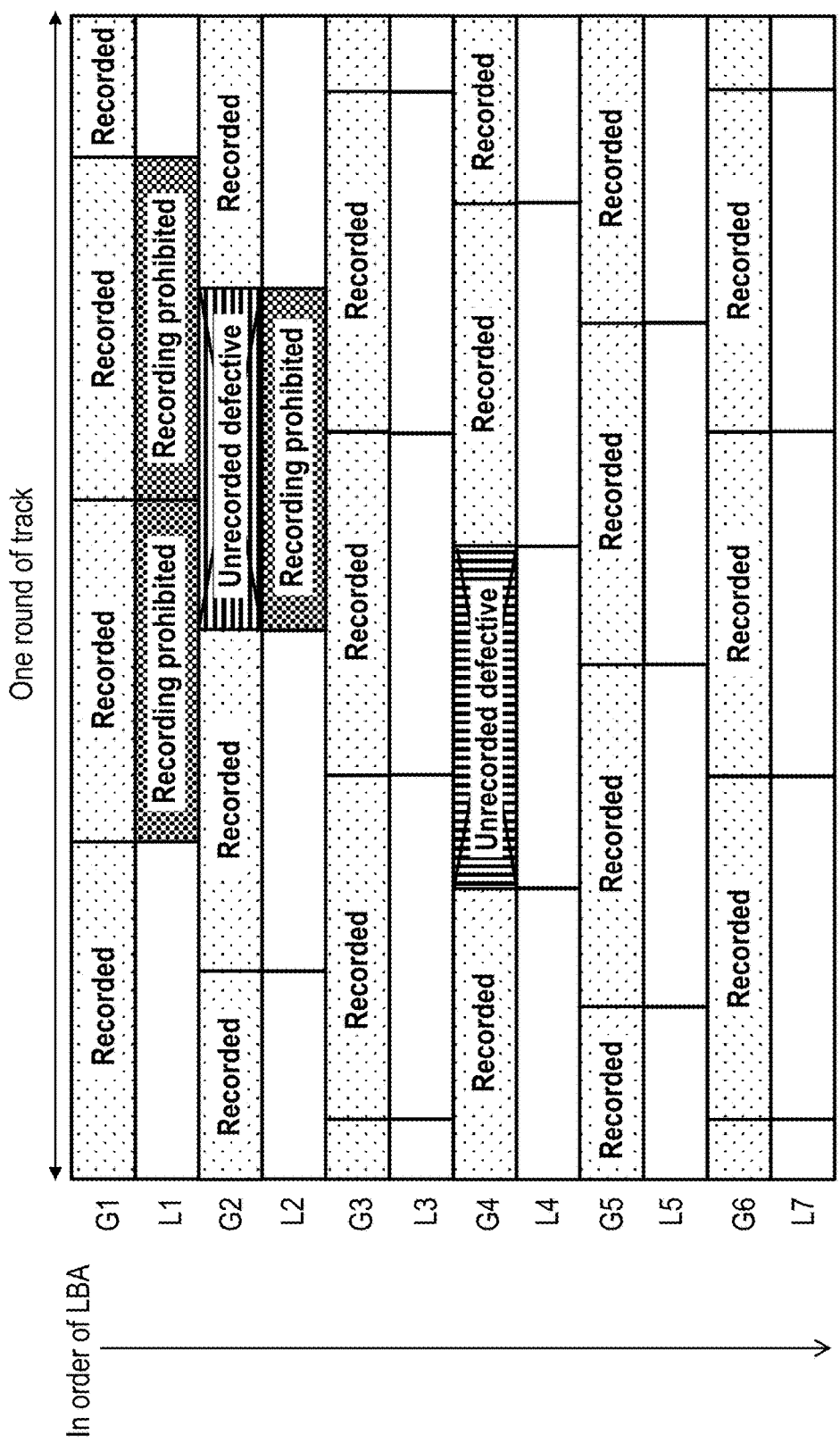
FIG. 12 is a diagram illustrating the recording constraint on a defective block of the optical disc according to the first exemplary embodiment.

Next, the second pattern will be described in detail. FIG. 12 is a diagram illustrating the recording constraint on the defective block of optical disc 1 according to the exemplary embodiment of the present disclosure.

The defective block detected during recording is classified into two cases including a first case and a second case. The first case is a recorded defective block that is determined to be defective when recording quality is determined to be insufficient in recording quality verification processing called "Verify" although the recording has been performed. The second case is the unrecorded defective block, which has become completely unrecorded or part of the block has become unrecorded when recording in the block itself fails due to some factor.

Among these defective blocks, since the unrecorded defective block has a locally unrecorded block which is left in the recorded area, blocks adjacent to this unrecorded defective block also become the recording prohibited blocks. That is, data to be recorded in the LBA corresponding to the recording prohibited block will be alternately recorded in the alternate area in the spare area.

Determination whether the adjacent tracks of the block to be recorded include the unrecorded defective blocks is made with reference to information on DFL 302 described in FIG. 4B. Using entry type information 413 of defective entry 412 in DFL 302 enables determination whether the block that is an alternate source managed by defective entry 412 is the "unrecorded defective block", enables above-described control, enables improvement in performance, and enables more efficient use of the alternate area in the spare area, which is a substitute area. That is, when the recording request in the block indicated by an arbitrary LBA is received, determination is made whether the virtual physical addresses of the blocks that belong to adjacent tracks of the block of the virtual physical address corresponding to the LBA agree with the virtual physical address indicated by alternate source positional information 414 of all the defective entries 412 of which entry type information 413 indicates the "unrecorded defective blocks" included in DFL 302. When the virtual physical addresses do not agree with each other, determination is made that the block indicated by the LBA is not the recording prohibited area and recording is performed in the requested block. When the virtual physical addresses agree with each other, determination is made that the block indicated by the LBA is the recording prohibited area and the recording data is alternately recorded in the alternate area included in the spare area. By performing control in this way, even when the recording request is received in any LBA from the higher level control apparatus, it is possible to perform control such that recording is not performed in the recording prohibited area.

The recording operation of optical disc drive 200 in user data area 11 is identical to procedures of FIG. 11 except for use of DFL 302 instead of SRRI 303 in the determination of step S1103 of FIG. 11, and thus detailed description will be omitted.

As described above, when the recording request in user data area 11 managed by LBA is received, use of information on SRRI 303 and DFL 302 enables determination and control whether the block of which recording is requested is the block included in the recording prohibited area, that is, whether recording may be performed as it is, or whether alternate recording is necessary.

Note that as recording control of optical disc drive 200 in user data area 11 according to the present exemplary embodiment, description of determination using SRRI 303 and description of determination using DFL 302 have been made separately. However, when performing recording in user data area 11, optical disc drive 200 determines the recording prohibited area from two pieces of information, DFL 302 and SRRI 303, and then performs recording processing.

(7) Recording Control of Lead-in Area, Etc. Of Optical Disc

As described above, the areas such as lead-in area 4, lead-out area 6, ISA 10, and OSA 12 are areas where a user cannot perform recording-reproduction directly. Moreover, in some areas, additional recording is not performed transitionally, but recording is completed at arbitrary single timing. For example, since recording in DMA 31 or servo adjustment area 33 is completed at specified timing, it is unnecessary to perform processing for determining the recording conditions of adjacent tracks by using the management information as user data area 11.

However, the areas such as TDMA 35 and OPC area 34 are areas which are transitionally recorded and used, and as in user data area 11, it is necessary to take into consideration the recording conditions of adjacent tracks of the block to be recorded.

First, recording control of TDMA 35 will be described.

TDMA 35 uses, for example, the groove tracks first, and when all the groove tracks are used up, TDMA 35 uses the land tracks included in the area.

Note that this is one example, and TDMA 35 may use the land tracks first, and when all the land tracks are used up, TDMA 35 may use the groove tracks included in the area.

Even if a plurality of TDMAs 35 is arranged discretely on optical disc 1, one TDMA 35 uses the groove tracks first. Such control results in that, when recording is performed in the groove tracks, the land tracks, which are adjacent tracks, always stay unrecorded. However, when an unrecorded defective block is generated during the use of the groove tracks, this area will have adverse influence on recording on the land tracks.

Accordingly, information regarding the unrecorded defective block, for example, the virtual physical address is stored and left in MDMI 300. Information regarding the unrecorded defective block in the groove tracks may be left in MDMI 300.

Then, during recording in the land tracks, this MDMI 300 is used to perform recording similar to measures against the unrecorded defective block in user data area 11 described in FIG. 12. Specifically, determination is made whether the virtual physical address of the block that belongs to adjacent tracks of the block to be recorded next agrees with the virtual physical address of the unrecorded defective block included in MDMI 300. When the virtual physical addresses do not agree with each other, determination is made that the block is not the recording prohibited area and recording is performed as it is in the block to be recorded next. On the other hand, when the virtual physical addresses agree with each other, determination is made that the block is the recording prohibited area, and control is performed such that the block is skipped and recording is performed in the next available block in the land tracks.

Next, the recording operation of optical disc drive 200 in TDMA 35 will be described. Optical disc drive 200 is activated when optical disc 1 is installed. In optical disc drive 200, the management information in management information storage memory 261, that is, SRRI 303, DFL 302, DDS 301, MDMI 300, and the like have already been updated from optical disc 1 to a latest state by management information update unit 274 of system controller 270.

Figure 13:
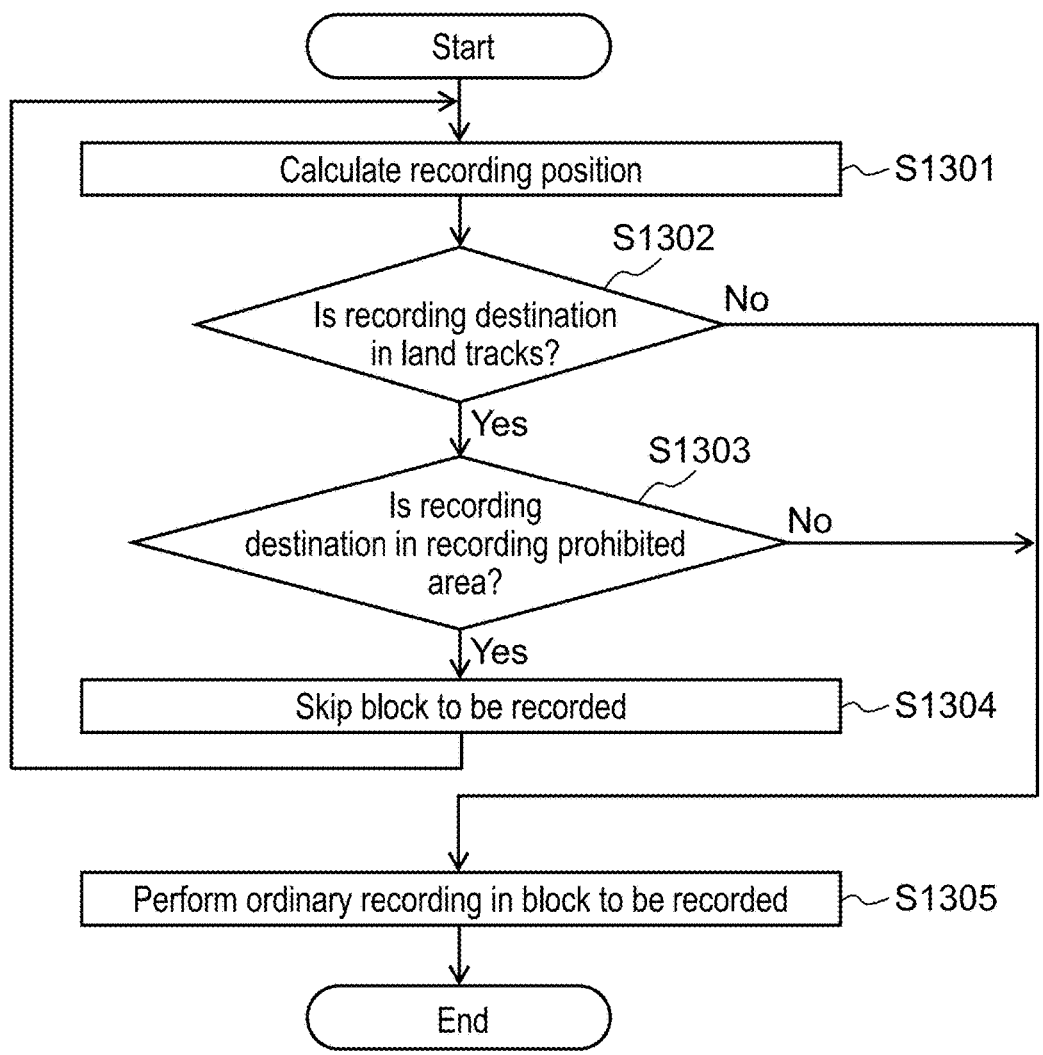
FIG. 13 is a flowchart illustrating one example of the recording sequence when the optical disc drive performs recording in TDMA according to the first exemplary embodiment.

FIG. 13 is a flowchart illustrating one example of the recording sequence when optical disc drive 200 performs recording in TDMA 35.

(Step S1301)

Optical disc drive 200 calculates the next recording position in TDMA 35. Specifically, system controller 270 calculates the block next to the recorded end position in TDMA 35 as the block to be recorded. Search for the end position is performed by determination whether the block has been recorded by using the reproduced signal of the track by control of reproduction unit 272. The search processing using the reproduced signal may be performed when optical disc drive 200 activates optical disc 1.

(Step S1302)

Optical disc drive 200 determines whether the recording destination is in the land tracks. Specifically, since TDMA 35 is an area in which recording is performed first in the groove tracks, during recording in the groove tracks, the recording conditions of the adjacent land tracks are always unrecorded and uniform. Accordingly, determination whether the block is in the recording prohibited area may be made only when the block to be recorded is in the land tracks. When the block to be recorded is in the land tracks (Yes), processing goes to step S1303. When the block to be recorded is in the groove tracks (No), processing goes to step S1305.

(Step S1303)

Optical disc drive 200 determines whether the block to be recorded is in the recording prohibited area. Specifically, recording prohibited area determination unit 275 included in system controller 270 acquires and calculates the virtual physical addresses of all the unrecorded defective blocks registered in latest MDMI 300 stored in management information storage memory 261. Then, based on the virtual physical addresses of the unrecorded defective blocks, recording prohibited area determination unit 275 calculates the virtual physical addresses of all the blocks which should be defined as the recording prohibited areas in the tracks adjacent thereto. Then, recording prohibited area determination unit 275 determines whether the virtual physical addresses of the blocks which should be the recording prohibited areas agree with the virtual physical address of the block to be recorded calculated in step S1301. When a result of the determination of recording prohibited area determination unit 275 is "agree" (Yes), processing goes to step S1304, whereas when the result is "not agree" (No), processing goes to step S1305.

(Step S1304)

Optical disc drive 200 skips the block to be recorded. Such an area as the spare area for alternate recording as in user data area 11 does not exist in TDMA 35. Accordingly, the block which is in the recording prohibited area is skipped, and since it is necessary to perform recording in the next recordable block, processing returns to step S1301.

(Step S1305)

Optical disc drive 200 performs ordinary recording in the block to be recorded. Specifically, for the calculated block, in order to record, in DMA 31, at least the management information that requires update recording of the latest management information stored in management information storage memory 261, recorder 271 records the management information on optical disc 1 via optical disc controller 230 and optical pickup 220. When recording processing fails in the block to be recorded and no recording is made in the block to be recorded at all, management information update unit 274 additionally registers information corresponding to the virtual physical address of the block in MDMI 300 stored in management information storage memory 261. Note that control is performed such that recorder 271 records MDMI 300 updated here in MDMA 30 of optical disc 1 at arbitrary timing until optical disc 1 is discharged from optical disc drive 200.

Since MDMA 30 is an area in which only groove tracks are recorded, it is secured that the recording conditions of adjacent land tracks are always unrecorded and uniform. Accordingly, the recording prohibited area does not exist.

Note that in the recording sequence described in FIG. 13, processing of step S1302 may be omitted. Recording in TDMA 35 can be performed so as not to perform recording in the recording prohibited area even if processing of step S1302 is not performed.

Note that the alternate areas included in ISA 10 and OSA 12, which are the spare areas, are also areas in which transient recording is performed sequentially from the grooves in a similar manner to TDMA 35, and recording can be performed in the recording sequence described in FIG. 13.

Next, recording control of OPC area 34 will be described.

Figure 14:
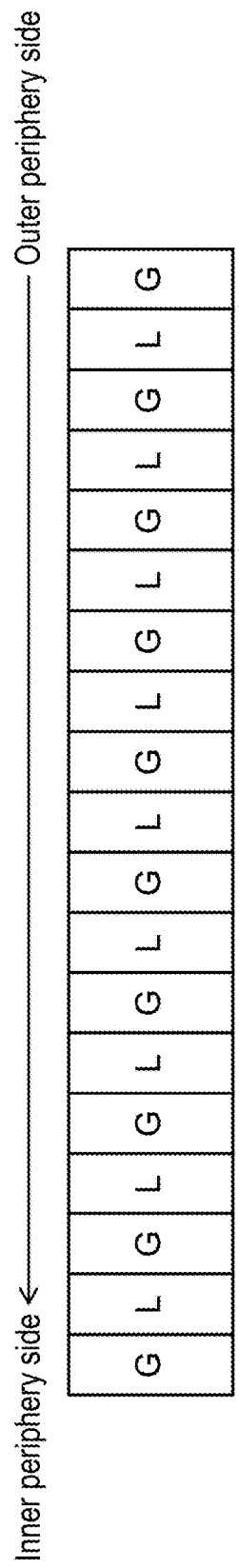
FIG. 14 is a diagram illustrating an initial state of an OPC area of the optical disc according to the first exemplary embodiment.
Figure 15:
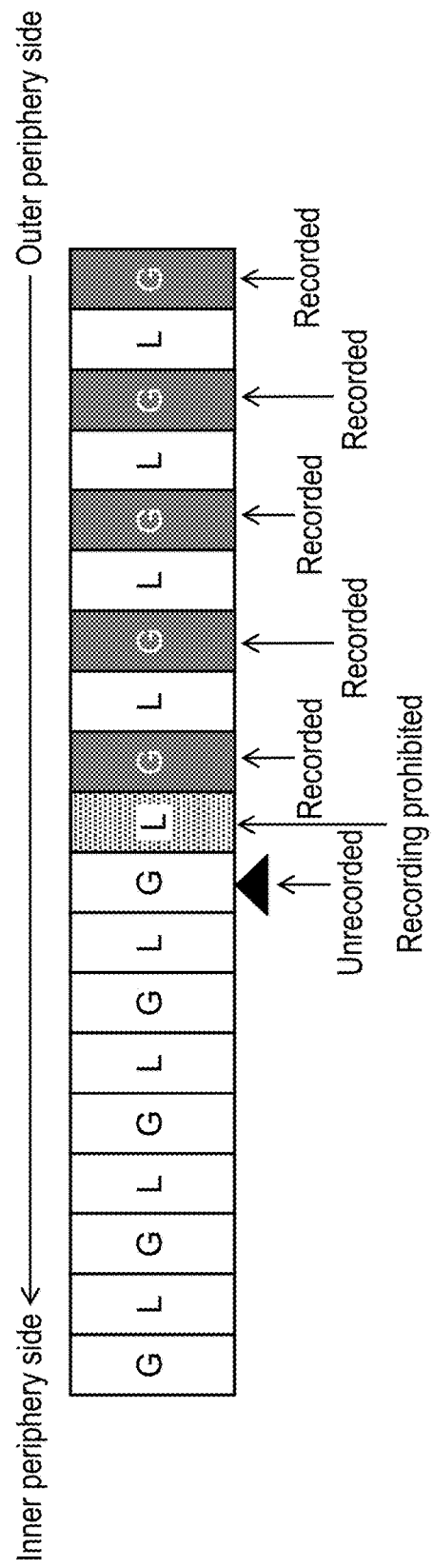
FIG. 15 is a diagram illustrating recording learning in the OPC area of the optical disc according to the first exemplary embodiment.

FIG. 14 is a diagram illustrating an initial state of OPC area 34 of optical disc 1 according to the present exemplary embodiment. FIG. 15 is a diagram illustrating recording learning in OPC area 34 of optical disc 1 according to the present exemplary embodiment. FIG. 16 is a diagram illustrating the recording constraint caused by the recording learning in OPC area 34 of optical disc 1 according to the present exemplary embodiment. FIG. 17 is another diagram illustrating the recording constraint caused by the recording learning in OPC area 34 of optical disc 1 according to the present exemplary embodiment.

OPC area 34 is used in a direction opposite to data area 5 or the like because power for recording may be inadequate. FIG. 14 also illustrates a case where the tracks are used in decreasing order of the physical address, that is, from an outer periphery side to an inner periphery side. However, even if the tracks are used in the opposite direction, since the blocks are used in increasing order of the physical address in recording on a block-by-block basis, that is, from a small physical address side to a large physical address side, the blocks are used from an outer periphery side to an inner periphery side on an arbitrary block-by-block basis. Also, the present exemplary embodiment describes an example in which, after recording learning is performed first in the groove tracks, recording learning is performed in the land tracks, and the groove tracks and the land tracks of OPC area 34 are used in competition against each other.

When recording learning in the groove tracks is performed in the state of FIG. 14, for example, the state transitions to the state illustrated in FIG. 15. At this time, the blocks included in the land track sandwiched between the recorded groove track and the unrecorded groove track are in the recording prohibited area. The area used for recording learning is unknown until recording learning is actually performed because retry is performed due to physical defects on a disc or the like.

As illustrated in FIG. 16, when a number of blocks used for recording learning in the land tracks is smaller than the number of blocks used for recording learning in the groove tracks, specifically, when five blocks are used in the groove tracks and four blocks are used in the land tracks for recording learning, recording learning does not reach the recording prohibited track.

However, as illustrated in FIG. 17, when the number of blocks used for recording learning in the land tracks is equivalent to or greater than the number of blocks used for recording learning in the groove tracks, specifically, when five blocks are used in the groove tracks and six blocks are used in the land tracks for recording learning, the blocks in the land tracks in which recording is prohibited are skipped, and the next unrecorded track is used. Note that the blocks included in the groove track adjacent to the skipped land track will be the recording prohibited track when next recording learning is performed.

In order to implement such control, DDS 301 described in FIG. 4C includes information such as OPC groove track next use positional information 427 and OPC land track next use positional information 428, which are information regarding the next available position in OPC area 34. All of these pieces of information are denoted, for example, in virtual physical address. While DDS 301 described in FIG. 4C is an example in which the recording layer is only one layer, examples of information to be stored for each recording layer include OPC groove track next use positional information 427, OPC land track next use positional information 428, ISA alternate area next use positional information 429, and OSA alternate area next use positional information 430.

When recording learning is performed first in the groove tracks, to begin with, recording learning is performed from the position indicated by OPC groove track next use positional information 427 toward an unrecorded area side in the groove tracks, and then OPC groove track next use positional information 427 is updated to the end position at which recording learning is completed. Subsequently, recording learning is performed from the position indicated by OPC land track next use positional information 428 toward an unrecorded area side in the land tracks. At this time, recording learning is performed while determination is made whether the block to be used reaches the next land track toward an inner periphery side of the track indicated by OPC groove track next use positional information 427. Then, when the block to be used next reaches the block included in the next land track toward an inner periphery side of the position indicated by OPC groove track next use positional information 427, the blocks which are in the recording prohibited area are skipped, and for example, the blocks of the land track that is one more track shifted toward an inner periphery side are used to start recording learning again. Then, OPC land track next use positional information 428 is updated to the end position at which recording learning is completed. At this time, as illustrated in FIG. 17, when recording learning in the land tracks is performed beyond the next land track toward an inner periphery side of the position indicated by OPC groove track next use positional information 427, OPC groove track next use positional information 427 and OPC land track next use positional information 428, which indicate the next available position in recording learning, are updated so as not to simply point at the block position next to the block at which immediately preceding recording learning is completed, but for example, so as to point at the position of the track on an unrecorded area side indicated by a triangle mark and a rhombus mark of FIG. 17, respectively.

Thus, control can be performed so as not to use the recording prohibited track caused by the recording conditions of adjacent tracks in OPC area 34 as well.

Next, the recording operation of optical disc drive 200 in OPC area 34 will be described. Optical disc drive 200 is activated when optical disc 1 is installed. In optical disc drive 200, latest management information, that is, SRRI 303, DFL 302, DDS 301, MDMI 300, and the like have been read from optical disc 1 to management information storage memory 261.

Figure 18:
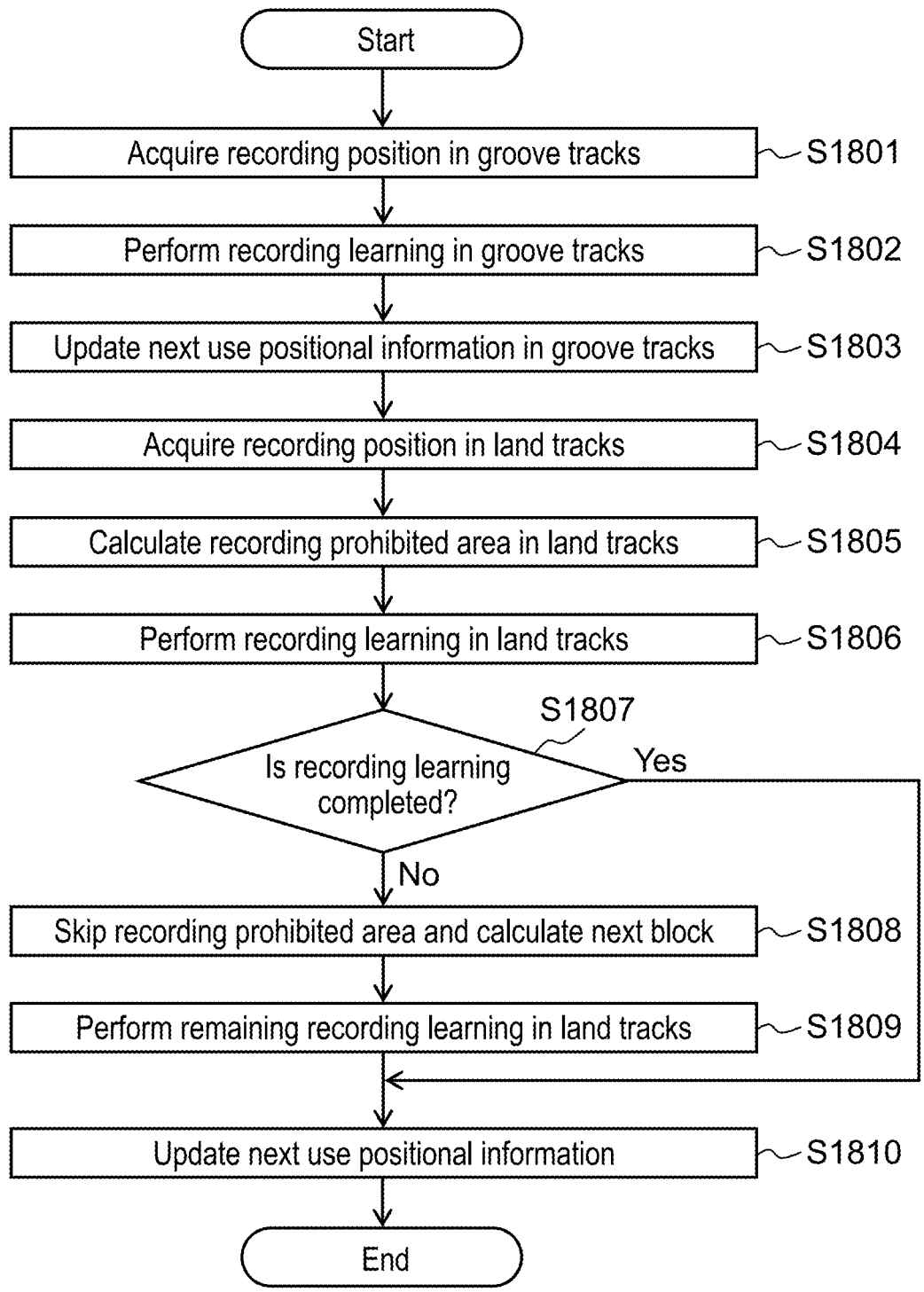
FIG. 18 is a flowchart illustrating one example of the recording sequence when the optical disc drive performs recording in the OPC area according to the first exemplary embodiment.

FIG. 18 is a flowchart illustrating one example of the recording sequence when optical disc drive 200 performs recording in OPC area 34.

(Step S1801)

Optical disc drive 200 acquires the next recording start position for learning in the groove tracks. Specifically, system controller 270 acquires OPC groove track next use positional information 427, which is the next available virtual physical address of the groove tracks in OPC area 34 from DDS 301 included in management information storage memory 261.

(Step S1802)

Optical disc drive 200 performs recording learning in the groove tracks. Specifically, recorder 271 and reproduction unit 272 in system controller 270 perform recording learning by using the unrecorded area with reference to the virtual physical address position acquired in step S1801. Since OPC area 34 is used in a direction opposite to the direction in ordinary areas in decreasing order of the physical address as described above, in order that the position of the virtual physical address acquired in step S1801 becomes the end position, OPC area 34 is used from the position that is shifted toward an inner periphery side from the position by a number of blocks necessary for recording learning. Also, in recording learning, a plurality of types of power is swung and recorded to determine optimum recording power, and recording and reproduction are performed for determining a write strategy, which is a condition such as a length of mark.
(Step S1803)

Optical disc drive 200 updates next recording start positional information for learning in the groove tracks. Specifically, management information update unit 274 updates OPC groove track next use positional information 427 included in DDS 301 included in management information storage memory 261 to the virtual physical address of a recorded-unrecorded boundary position of the groove tracks used in step S1802, that is, the innermost periphery position. Specifically, management information update unit 274 updates OPC groove track next use positional information 427, for example, to the position of the triangle mark of FIG. 15.
(Step S1804)

Optical disc drive 200 acquires the next recording start position for learning in the land tracks. Specifically, system controller 270 acquires OPC land track next use positional information 428 which is the next available virtual physical address of the land tracks in OPC 34 from DDS 301 included in management information storage memory 261.
(Step S1805)

Optical disc drive 200 calculates the recording prohibited area in the land tracks. For example, optical disc drive 200 calculates the recording prohibited area as illustrated in FIG. 15. Specifically, recording prohibited area determination unit 275 included in system controller 270 acquires OPC groove track next use positional information 427 in latest DDS 301 stored in management information storage memory 261, and based on the virtual physical address, recording prohibited area determination unit 275 calculates the virtual physical addresses of all the blocks which should be the recording prohibited areas in the land tracks adjacent thereto.
(Step S1806)

Optical disc drive 200 performs recording learning in the land tracks. Specifically, recorder 271 and reproduction unit 272 in system controller 270 perform recording learning by using unrecorded areas with reference to the virtual physical address position acquired in step S1804. Since OPC area 34 is used in a direction opposite to the direction in ordinary areas in decreasing order of the physical address as described above, in order that the position of the virtual physical address acquired in step S1804 becomes the end position, OPC area 34 is used from the position that is shifted toward an inner periphery side from the position by the number of blocks necessary for recording learning. Also, in recording learning, a plurality of types of power is swung and recorded to determine optimum recording power, and recording and reproduction are performed for determining a write strategy, which is a condition such as a length of pit. At this time, when the block to be used for recording learning agrees with the block included in the recording prohibited area determined in step S1805, learning processing is temporarily suspended.
(Step S1807)

Optical disc drive 200 determines in step S1806 whether recording learning in the land tracks is completed. Specifically, system controller 270 determines whether recording learning in the land tracks performed in step S1806 is temporarily suspended due to entry into the recording prohibited area. When suspended temporarily (No), system controller 270 determines that learning is uncompleted, and otherwise (Yes) system controller 270 determines that learning is completed. Then, when it is determined that learning is uncompleted, processing goes to step S1808, whereas when it is determined that learning is completed, processing goes to step S1810.
(Step S1808)

Optical disc drive 200 skips the recording prohibited area and calculates the position of the next block. Specifically, system controller 270 skips the block of the recording prohibited area determined in step S1805, and calculates the virtual physical address of the next available block.
(Step S1809)

Optical disc drive 200 performs remaining recording learning in the land tracks. Specifically, recorder 271 and reproduction unit 272 in system controller 270 use the unrecorded areas to perform recording learning that has not been completed in step S1806 with reference to the virtual physical address position acquired in step S1808. Specifically, recording learning is performed as illustrated in FIG. 17.
(Step S1810)

Optical disc drive 200 updates the next use positional information. Specifically, first, when step S1809 is performed, that is, when recording learning is performed in more areas in the land tracks than in the groove tracks and the blocks are used beyond the recording prohibited area, management information update unit 274 in system controller 270 updates OPC groove track next use positional information 427 included in DDS 301 included in management information storage memory 261 so as to point at the block of the groove track that is one more track shifted inward from the groove track on an inner periphery side of the virtual physical address of the recorded-unrecorded boundary position of the land tracks used for recording learning in step S1809, that is, at the innermost periphery position. Specifically, OPC groove track next use positional information 427 is updated to the position of the triangle mark of FIG. 17. Furthermore, in this case, OPC land track next use positional information 428 is updated so as to point at block 3 of the land track on an unrecorded area side of the block indicated by OPC groove track next use positional information 427 included in DDS 301 included in management information storage memory 261, that is, on an inner periphery side. Specifically, OPC land track next use positional information 428 is updated to the position of the rhombus mark of FIG. 17. In contrast, when recording learning in the land tracks is completed in step S1806, OPC land track next use positional information 428 included in DDS 301 included in management information storage memory 261 is updated to the virtual physical address of the recorded-unrecorded boundary position of the land tracks used in step S1806, that is, the position on an innermost periphery side. Specifically, OPC land track next use positional information 428 is updated to the position of the rhombus mark of FIG. 16.

By performing recording learning in this way, at timing of starting recording learning, control can be performed such that OPC groove track next use positional information 427 and OPC land track next use positional information 428, which indicate the next available position, indicate actually available position in consideration of the recording prohibited area caused by the recording conditions of adjacent tracks.

For example, at timing of acquiring information regarding the next available position in step S1801 or step S1804, processing may be performed for checking the recording conditions of adjacent tracks and correcting the position to the actually recordable position.

Note that when the unrecorded defective block is generated during use of the groove tracks in OPC area 34, its information is left in MDMI 300 in a similar manner to TDMA 35 described above. This makes it possible to know the recording prohibited area during recording learning in the land tracks by using the information in MDMI 300, and thus to perform control not to use the recording prohibited area.

While optical disc 1 of the present exemplary embodiment includes one or more recording layers in the above description, optical disc 1 may be a double-sided disc in which the recording layers are disposed on both sides of the disc.

The information recording medium according to the present disclosure is applicable to the write-once optical disc and the like that has an information recording surface capable of optically recording information on each of the land and the groove as recording tracks, and that allows additional recording from an arbitrary position. The information recording method and information recording device according to the present disclosure are applicable to the optical disc drive device or the like capable of performing recording-reproduction of the write-once optical disc that has the information recording surface capable of optically recording information on each of the land and the groove as recording tracks, and that allows additional recording from an arbitrary position.

What is claimed is:

1. A write-once information recording medium comprising one or more recording layers,
    each of the recording layers being spiral-shaped on which a land track and a groove track are alternately repeated as recording tracks, each of the recording tracks being divided into blocks, each of the blocks being a minimum unit in which recording is performed, and
    each of the recording layers including a management information area for recording management information and a user data area for recording user data,
    wherein the management information area comprises recording condition management information that manages a recording condition of the management information.

2. The information recording medium according to claim 1, wherein
    the recording condition management information comprises positional information capable of identifying a position of each of the blocks which is unrecorded due to failure in recording in the management information area, and
    the recording condition management information is recorded only on one of the recording tracks of the land track and the groove track.

3. The information recording medium according to claim 1, wherein
    the management information area further comprises a defect list that manages information regarding a defective block in the user data area,
    the defect list comprises positional information on the defective block and type information that indicates a type of the defective block, and
    the type information indicates whether the defective block is an unrecorded defect that comprises an unrecorded section.

* * * * *